(12) United States Patent  
Terashima

(10) Patent No.: US 8,237,378 B2  
(45) Date of Patent: Aug. 7, 2012

(54) DRIVING DEVICE FOR DISCHARGE LAMP, LIGHT SOURCE DEVICE, PROJECTOR, AND DRIVING METHOD FOR DISCHARGE LAMP

(75) Inventor: Tetsuo Terashima, Chino (JP)

(73) Assignee: Seiko Epson Corporation, Tokyo (JP)

( * ) Notice: Subject to any disclaimer, the term of this patent is extended or adjusted under 35 U.S.C. 154(b) by 365 days.

(21) Appl. No.: 12/683,140

(22) Filed: Jan. 6, 2010

(65) Prior Publication Data

US 2010/0194311 A1    Aug. 5, 2010

(30) Foreign Application Priority Data

Feb. 3, 2009    (JP) ................................. 2009-022251

(51) Int. Cl.  
*H05B 37/02*    (2006.01)

(52) U.S. Cl. ................ 315/307; 315/200 R; 315/209 R; 315/291; 315/308; 353/49; 353/85; 353/98

(58) Field of Classification Search .......... 315/200 R, 315/209 R, 291, 307, 308; 353/49, 85, 98  
See application file for complete search history.

(56) References Cited

U.S. PATENT DOCUMENTS

| | | | |
|---|---|---|---|
| 6,232,725 B1* | 5/2001 | Derra et al. ............... | 315/209 R |
| 7,288,899 B2 | 10/2007 | Akiyama | |
| 7,323,824 B2* | 1/2008 | Brates et al. .................. | 315/224 |
| 7,327,096 B2* | 2/2008 | Monch et al. ................. | 315/291 |
| 7,446,482 B2* | 11/2008 | Sugaya ..................... | 315/200 R |
| 2006/0066261 A1* | 3/2006 | Rahmane et al. ............. | 315/291 |
| 2006/0222317 A1 | 10/2006 | Ono et al. | |
| 2008/0297739 A1* | 12/2008 | Yamauchi et al. .............. | 353/85 |

FOREIGN PATENT DOCUMENTS

| | | |
|---|---|---|
| JP | 2006-004919 A | 1/2006 |
| JP | 2006-286034 A | 10/2006 |
| JP | 2007-273235 A | 10/2007 |
| JP | 4241615 B | 1/2009 |
| WO | WO04/002200 | 12/2003 |

* cited by examiner

*Primary Examiner* — Douglas W Owens  
*Assistant Examiner* — Thai Pham  
(74) *Attorney, Agent, or Firm* — AdvantEdge Law Group, LLC

(57) ABSTRACT

A driving device adapted to drive a discharge lamp including first and second electrodes adapted to generate discharge light, a primary reflecting mirror disposed on a side of the second electrode and adapted to reflect the discharge light, a secondary reflecting mirror disposed on a side of the first electrode and adapted to reflect the discharge light. The driving device includes: a deterioration detection section adapted to detect a degree of progression of deterioration in the first and the second electrodes; and a deterioration handling section adapted to increase first anode power energy, which is supplied while the first electrode acts as an anode, in accordance with the degree of progression of the deterioration detected by the deterioration detection section.

18 Claims, 16 Drawing Sheets

DRIVING DEVICE FOR DISCHARGE LAMP, LIGHT SOURCE DEVICE, PROJECTOR, AND DRIVING METHOD FOR DISCHARGE LAMP

BACKGROUND

1. Technical Field

The present invention relates to a technology for driving a discharge lamp.

2. Related Art

As a discharge lamp used for a light source of a projector (a projection apparatus), there is known a high intensity discharge lamp (HID lamp) such as a high-pressure mercury lamp, a metal halide lamp, or a high-pressure sodium lamp. In general, the discharge lamp in the projector emits light by generating discharge light between a pair of electrodes caused by an arc discharge in response to an alternating current supply.

As one of the technologies using the discharge lamp, there is known a technology of providing a primary reflecting mirror for reflecting the discharge light toward an object on the side of one of the electrodes, a secondary reflecting mirror for reflecting the discharge light, which is emitted toward the other of the electrodes, toward the primary reflecting mirror on the side of the other of the electrodes. Since such a secondary reflecting mirror is disposed close to the electrode compared to the primary reflecting mirror, the electrode on the secondary reflecting mirror side is in the environment inferior in heat radiation performance compared to that of the electrode on the primary reflecting mirror side. Therefore, there arises the problem that the deterioration of the electrode on the secondary reflecting side is apt to be advanced due to deformation caused by excessive melting compared to the electrode on the primary reflecting mirror side.

In the past, in order for preventing the deterioration in the electrode on the secondary reflecting mirror side, there has been proposed a technology for reducing the amount of heat generation in the electrode on the secondary reflecting mirror side by making the electrical power energy supplied thereto during the period in which the electrode on the secondary reflecting mirror side functions as the anode smaller than the electrical power energy supplied thereto during the period in which the electrode on the primary reflecting mirror side functions as the anode (JP-A-2006-4919).

However, in the related art technology, although the deterioration in the electrode on the secondary reflecting mirror side caused by the excessive melting can be prevented during the initial stage of the product life cycle, there still arises the problem that in the case in which the amount of heat radiation in each of the electrodes is relatively decreased by increase in the distance between the electrodes with elapse of operating time, it becomes unachievable to melt the electrode on the secondary reflecting mirror side to the extent that the shape of the electrode can be maintained, thus the deterioration in the electrode on the secondary reflecting mirror side is even more advanced due to the deformation caused by insufficient melting.

SUMMARY

An advantage of some aspects of the invention is to provide a technology capable of achieving longer operating life of the discharge lamp.

The invention is for solving at least a part of the problem described above, and can be realized as the following embodiments or aspects.

According to a first aspect of the invention, there is provided a driving device adapted to drive a discharge lamp provided with first and second electrodes adapted to generate discharge light, a primary reflecting mirror disposed on a side of the second electrode and adapted to reflect the discharge light, and a secondary reflecting mirror disposed on a side of the first electrode so as to be opposed to the primary reflecting mirror, and adapted to reflect the discharge light, which is emitted toward the first electrode, toward the primary reflecting mirror, the driving device including a deterioration detection section adapted to detect a degree of progression of deterioration in the first and the second electrodes, and a deterioration handling section adapted to increase first anode power energy, which is supplied while the first electrode acts as an anode, in accordance with the degree of progression of the deterioration detected by the deterioration detection section. According to the driving device of the first aspect of the invention, the amount of heat generated in the first electrode on the side of the secondary reflecting mirror is increased in accordance with the degree of progression of the deterioration in the first and second electrodes, and thus the progression of the deterioration due to the insufficient melting in the first electrode can be prevented. As a result, longer operating life of the discharge lamp can be achieved.

According to a second aspect of the invention, in the driving device of the first aspect of the invention, it is possible that the deterioration detection section detects the degree of progression of the deterioration in the first and second electrodes based on at least one of a voltage in the first and second electrodes, a current in the first and second electrodes, a flicker of the discharge light, and illuminance of the discharge light. According to the driving device of the second aspect of the invention, the degree of progression of the deterioration in the first and second electrodes can easily be detected.

According to a third aspect of the invention, in the driving device of one of the first and second aspects of the invention, it is also possible that the deterioration handling section increases the first anode power energy from an initial state of being smaller than second anode power energy, which is supplied while the second electrode acts as the anode, in accordance with the degree of progression of the deterioration detected by the deterioration detection section. According to the driving device of the third aspect of the invention, the deterioration of the electrode on the side of the secondary reflecting mirror due to the excessive melting can be prevented in the initial stage of the product life cycle.

According to a fourth aspect of the invention, in the driving device of any one of the first through third aspects of the invention, it is also possible that the deterioration handling section increases the first anode power energy from a state of being smaller than second anode power energy, which is supplied while the second electrode acts as the anode, to a state of being larger than the second anode power energy in accordance with the degree of progression of the deterioration detected by the deterioration detection section. According to the driving device of the fourth aspect of the invention, prevention of the excessive melting and the insufficient melting in the first electrode on the side of the secondary reflecting mirror can effectively be executed.

According to a fifth aspect of the invention, in the driving device of any one of the first through fourth aspects of the invention, it is also possible that the deterioration handling section switches the first and second anode power energy supplied while the first and second electrodes act as the anode, respectively, between a larger value and a smaller value alternately in accordance with the degree of progression of the deterioration detected by the deterioration detection section, thereby increasing the first anode power energy in accordance with the degree of progression of the deterioration. According to the driving device of the fifth aspect of the invention, the insufficient melting in the second electrode caused by increasing the first anode power energy and decreasing the second anode power energy can be prevented.

According to a sixth aspect of the invention, in the driving device of the fifth aspect of the invention, it is also possible that the deterioration handling section increases a difference between the larger value and the smaller value in the first and second anode power energy in accordance with the degree of progression of the deterioration while alternately switching the first and second anode power energy between the larger value and the smaller value in accordance with the degree of progression of the deterioration, thereby increasing the first anode power energy in accordance with the degree of progression of the deterioration. According to the driving device of the sixth aspect of the invention, the insufficient melting in both of the first and second electrodes can be prevented in accordance with the progression of the deterioration in the first and second electrodes.

According to a seventh aspect of the invention, in the driving device of the fifth aspect of the invention, it is also possible that the deterioration handling section includes an interval measurement section adapted to measure a time interval with which the first and second anode power energy is switched between the larger value and the smaller value, and a power difference adjustment section adapted to adjust a difference between the larger value and the smaller value in the first and second anode power energy in accordance with the time interval measured by the interval measurement section. According to the driving device of the seventh aspect of the invention, the insufficient melting in both of the first and second electrodes can be prevented in accordance with how difficult the melting is in the first and second electrodes.

According to an eighth aspect of the invention, in the driving device of any one of the first through seventh aspects of the invention, it is also possible that the deterioration handling section executes at least one of change in a ratio between the anode periods during which the first and second electrodes act as the anode, respectively, and increase and decrease of a current value supplied while the first electrode acts as the anode, thereby increasing the first anode power energy in accordance with the degree of progression of the deterioration. According to the driving device of the eighth aspect of the invention, the first anode power energy can be increased by relatively easy control.

According to a ninth aspect of the invention, there is provided a light source device adapted to emit light, including a discharge lamp adapted to emit discharge light generated between a first electrode and a second electrode, a primary reflecting mirror disposed on a side of the second electrode and adapted to reflect the discharge light, a secondary reflecting mirror disposed on a side of the first electrode so as to be opposed to the primary reflecting mirror, and adapted to reflect the discharge light, which is emitted toward the first electrode, toward the primary reflecting mirror, a deterioration detection section adapted to detect a degree of progression of deterioration in the first and the second electrodes, and a deterioration handling section adapted to increase first anode power energy, which is supplied while the first electrode acts as an anode, in accordance with the degree of progression of the deterioration detected by the deterioration detection section. According to the light source device of the ninth aspect of the invention, the amount of heat generated in the first electrode on the side of the secondary reflecting mirror is increased in accordance with the degree of progression of the deterioration in the first and second electrodes, and thus the progression of the deterioration due to the insufficient melting in the first electrode can be prevented.

According to a tenth aspect of the invention, there is provided a projector adapted to project an image, including a discharge lamp adapted to emit discharge light generated between a first electrode and a second electrode as a light source of projection light adapted to represent the image, a primary reflecting mirror disposed on a side of the second electrode and adapted to reflect the discharge light, a secondary reflecting mirror disposed on a side of the first electrode so as to be opposed to the primary reflecting mirror, and adapted to reflect the discharge light, which is emitted toward the first electrode, toward the primary reflecting mirror, a deterioration detection section adapted to detect a degree of progression of deterioration in the first and the second electrodes, and a deterioration handling section adapted to increase first anode power energy, which is supplied while the first electrode acts as an anode, in accordance with the degree of progression of the deterioration detected by the deterioration detection section. According to the projector of the tenth aspect of the invention, the amount of heat generated in the first electrode on the side of the secondary reflecting mirror is increased in accordance with the degree of progression of the deterioration in the first and second electrodes, and thus the progression of the deterioration due to the insufficient melting in the first electrode can be prevented.

According to an eleventh aspect of the invention, there is provided a driving method adapted to drive a discharge lamp having first and second electrodes adapted to generate discharge light, a primary reflecting mirror disposed on a side of the second electrode and adapted to reflect the discharge light, and a secondary reflecting mirror disposed on a side of the first electrode so as to be opposed to the primary reflecting mirror, and adapted to reflect the discharge light, which is emitted toward the first electrode, toward the primary reflecting mirror, the driving method including detecting a degree of progression of deterioration in the first and the second electrodes, and increasing first anode power energy, which is supplied while the first electrode acts as an anode, in accordance with the degree of progression of the deterioration detected in the detecting step. According to the driving method of the eleventh aspect of the invention, the amount of heat generated in the first electrode on the side of the secondary reflecting mirror is increased in accordance with the degree of progression of the deterioration in the first and second electrodes, and thus the progression of the deterioration due to the insufficient melting in the first electrode can be prevented.

The aspects of the invention is not limited to the driving device, the light source device, the projector, and the driving method, but can also be applied to other aspects such as a system equipped with the projector or a program for making a computer realize the function of driving the discharge lamp. Further, the invention is not at all limited to the aspects described above, but can obviously be put into practice in various forms within the scope or the spirit of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

In order for making the configuration and function of the invention described hereinabove more apparent, a projector as a projection apparatus to which the invention is applied will hereinafter be explained.

A. Embodiment

A1. Configuration of Projector

Figure 1:
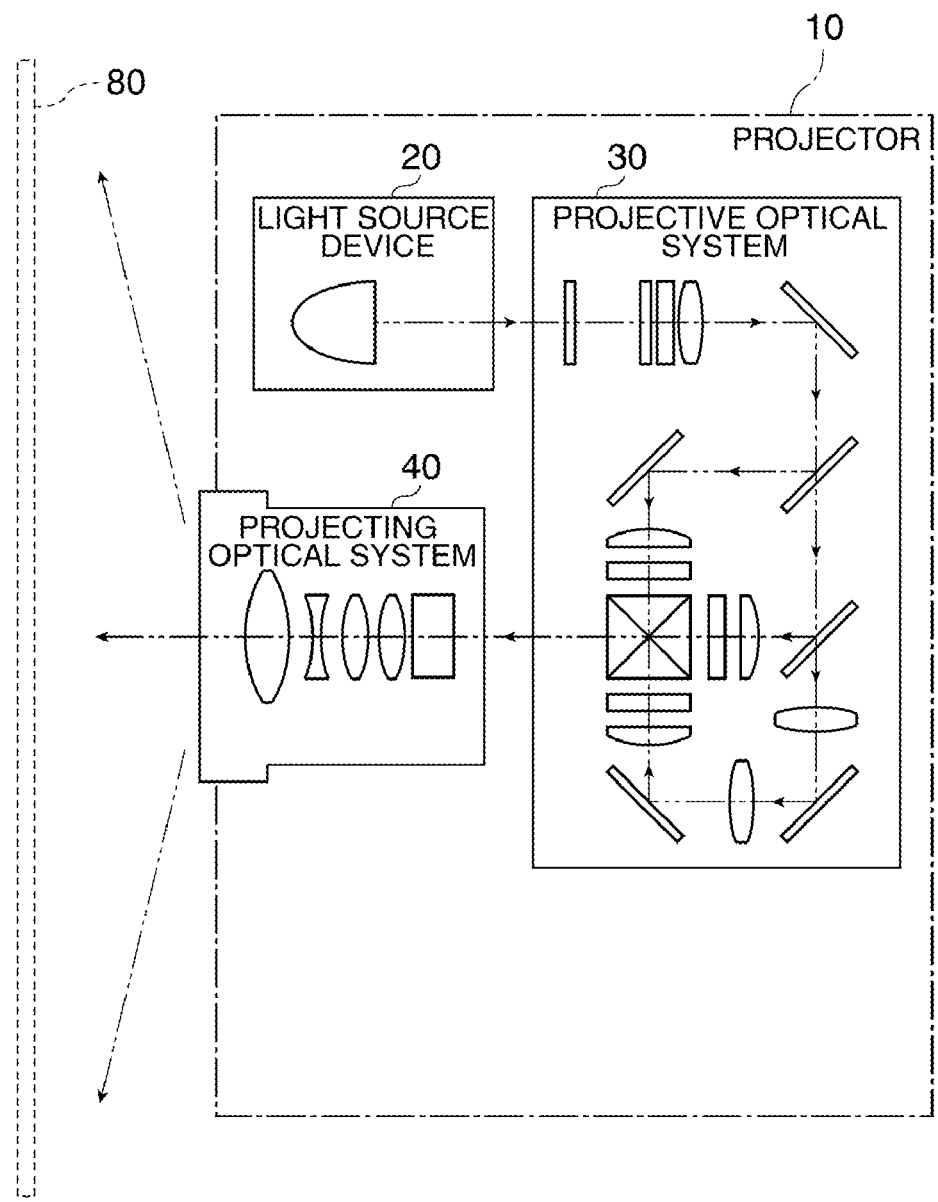
FIG. 1 is an explanatory diagram mainly showing a configuration of a projector.

FIG. 1 is an explanatory diagram mainly showing a configuration of a projector 10. The projector 10 projects an image on a screen 80. The screen 80 is a plane on which the image is displayed, and can be a projection screen or a wall surface.

The projector 10 is provided with a light source device 20, a projective optical system 30, and a projecting optical system 40. The light source device 20 of the projector 10 functions as a light source to emit light, and the light emitted from the light source device 20 is supplied to the projective optical system 30. Details of the light source device 20 will be described later.

The projective optical system 30 of the projector 10 generates projection light representing the image from the light supplied from the light source device 20. The projection light generated by the projective optical system 30 is output to the projecting optical system 40. In the present embodiment, the projective optical system 30 corresponds to a color separation composition optical system, and separates the light supplied from the light source device 20 into red light, green light, and blue light, then modulates them respectively with three spatial light modulators, and then combines them into single light again, thereby generating the projection light. Although in the present embodiment, there are provided the three spatial light modulators, it is also possible to provide less than three or more than three spatial light modulators in other embodiments. Although in the present embodiment, the spatial light modulators are transmissive liquid crystal panels for modulating the light transmitted therethrough, it is also possible to use reflective liquid crystal panels for modulating the light reflected thereon or a micromirror light modulation device such as a digital micromirror device (DMD (registered trademark)) in other embodiments.

The projecting optical system 40 of the projector 10 projects the projection light, which is generated by the projective optical system 30, on the screen 80. In the present embodiment, the projecting optical system 40 is a projecting lens unit having a plurality of lenses such as a front lens, a zoom lens, a master lens, and a focus lens arranged. It should be noted that the projecting optical system 40 is not limited to the projecting lens unit, but can also be an optical system for reflecting the projection light generated by the projective optical system 30 toward the screen 80, using at least one of an aspheric lens, a magnifying lens, diffusion glass, an aspheric mirror, and a reflecting mirror.

A2. Detailed Configuration of Light Source Device

Figure 2:
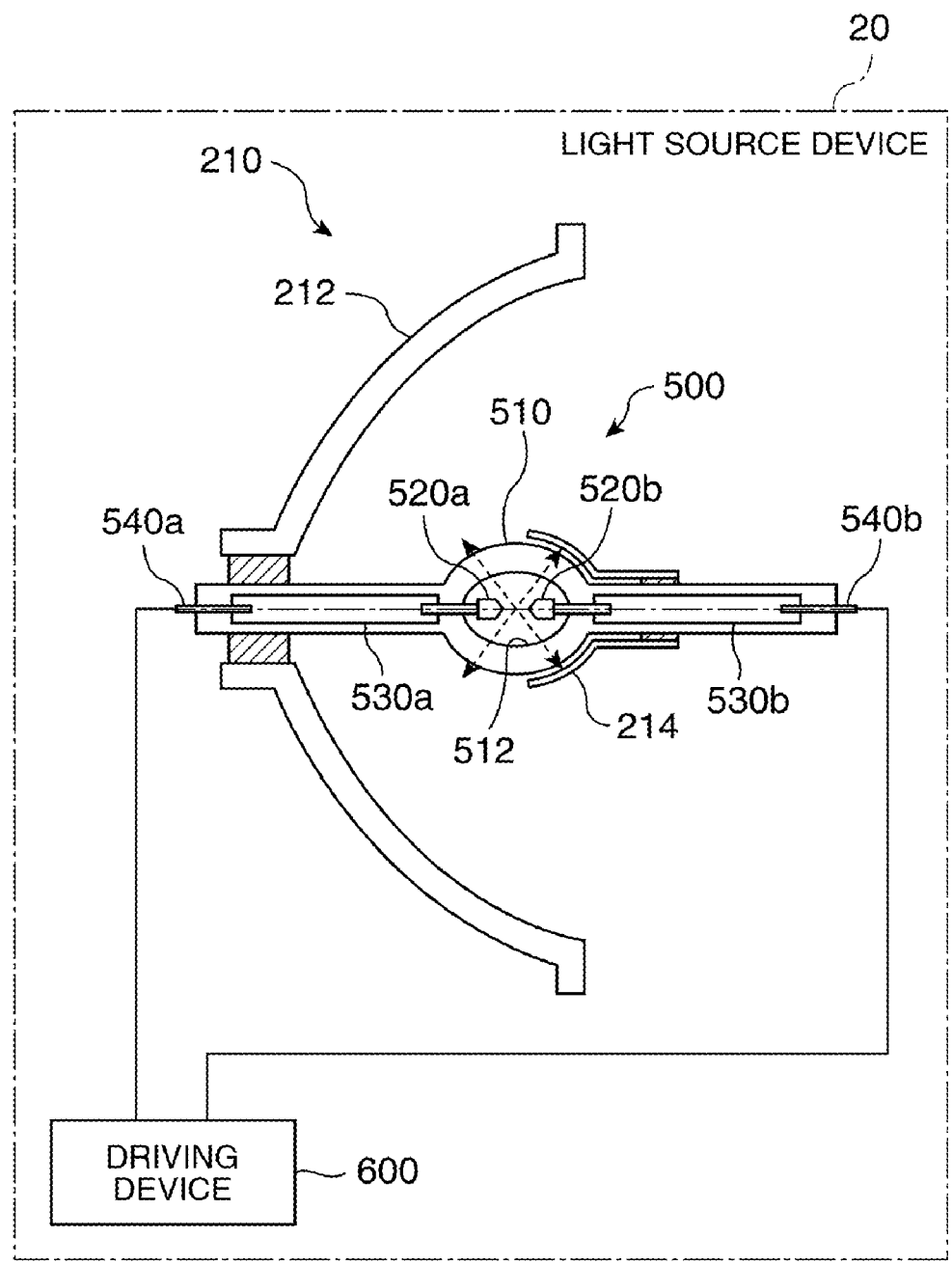
FIG. 2 is an explanatory diagram showing a detailed configuration of a light source device in the projector.

FIG. 2 is an explanatory diagram showing a detailed configuration of the light source device 20 in the projector 10. The light source device 20 is provided with a light source unit 210 and a driving device 600. The light source unit 210 of the light source device 20 is provided with a primary reflecting mirror 212, a secondary reflecting mirror 214, and a discharge lamp 500.

The discharge lamp 500 of the light source unit 210 is provided with a light emitting tube 510, a pair of electrodes 520a, 520b, a pair of conducting members 530a, 530b, and a pair of electrode terminals 540a, 540b. The discharge lamp 500 is driven by the driving device 600, and emits light using arc discharge generated between the electrode 520b as a first electrode and the electrode 520a as a second electrode. Details of the driving device 600 will be described later.

The light emitting tube 510 of the discharge lamp 500 is a quartz glass tube having translucency, and a central portion bulging to form a spherical shape, and the central portion of the light emitting tube 510 is formed as a discharge space section 512 encapsulating a gas including rare gas, and a discharge medium such as mercury or metallic halide.

The electrodes 520a, 520b of the discharge lamp 500 are disposed in the discharge space section 512 of the light emitting tube 510 separated from each other, and generate arc discharge inside the discharge space section 512 of the light emitting tube 510. In the present embodiment, the electrodes 520a, 520b are made of tungsten. Details of the electrodes 520a, 520b will be described later.

The conducting member 530a of the discharge lamp 500 is an electric conductor for electrically connecting the electrode 520a and the electrode terminal 540a to each other, and the conducting member 530b of the discharge lamp 500 is an electric conductor for electrically connecting the electrode 520b and the electrode terminal 540b to each other. In the present embodiment, the conducting members 530a, 530b are each formed of molybdenum foil, and encapsulated in the light emitting tube 510.

The electrode terminals 540a, 540b of the discharge lamp 500 are electric conductors for introducing the alternating current, which is supplied from the driving device 600, to the electrodes 520a, 520b, and are respectively provided to the both ends of the light emitting tube 510.

The primary reflecting mirror 212 of the light source unit 210 has a concave reflecting surface. The primary reflecting mirror 212 is disposed at the end of the discharge lamp 500 on the electrode 520a side, and reflects the discharge light generated by the discharge lamp 500 toward the projective optical system 30 as a reflection object. Although in the present embodiment, the reflecting surface of the primary reflecting mirror 212 has a spheroidal shape, it can also have a paraboloidal shape in other embodiments. Although in the present embodiment, the primary reflecting mirror 212 is made of quartz glass, it can also be made of crystallized glass in other embodiments.

The secondary reflecting mirror 214 of the light source unit 210 has a hemispherical reflecting surface smaller than the primary reflecting mirror 212. The secondary reflecting mirror 214 is disposed at the central portion of the discharge lamp 500 where the discharge space section 512 is formed and on the electrode 520b side, and reflects the discharge light, which is generated by the discharge lamp 500 and emitted toward the electrode 520b side, toward the primary reflecting mirror 212. In other words, the light emitted from the discharge lamp 500 and then reflected by the secondary reflecting mirror 214 is then returned to the discharge lamp 500 (mainly to the discharge space section 512). Although in the present embodiment, the secondary reflecting mirror 214 is made of quartz glass, it can also be made of crystallized glass in other embodiments.

Figure 3:
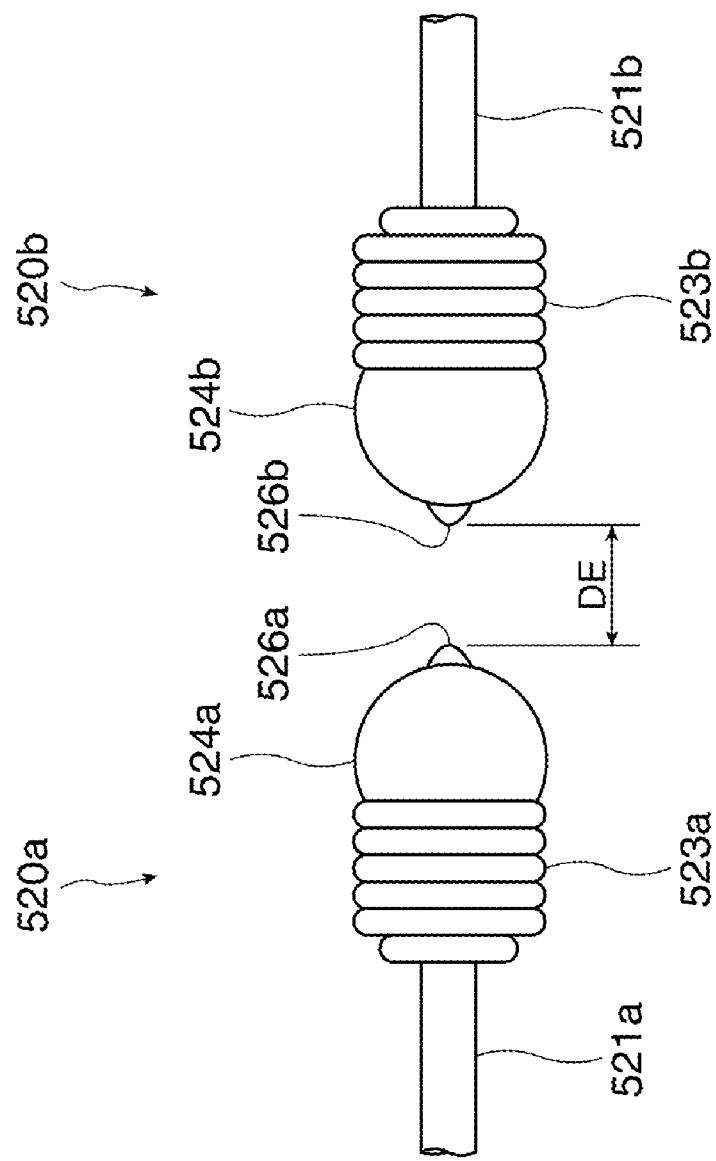
FIG. 3 is an explanatory diagram showing a detailed configuration of a pair of electrodes.

FIG. 3 is an explanatory diagram showing a detailed configuration of the electrodes 520a, 520b. The electrodes 520a, 520b are provided with shaft sections 521a, 521b, coil sections 523a, 523b, aggregated sections 524a, 524b, and projection sections 526a, 526b, respectively. The shaft sections 521a, 521b are rod-like tungsten members extending toward the electrodes 520b, 520a on the other side, respectively. By winding tungsten wires around the tips of the shaft sections 521a, 521b, and then heating to melt the tips thereof, parts of the tungsten wires incompletely-melted are formed as the coil sections 523a, 523b, and parts of the tungsten wires completely-melted are formed as the aggregated sections 524a, 524b, respectively. The aggregated sections 524a, 524b are formed at the tips of the shaft sections 521a, 521b opposed to the electrodes 520b, 520a of the other side, and have diameters larger than those of the shaft sections 521a, 521b, respectively.

The projection sections 526a, 526b are formed on the aggregated sections 524a, 524b close to the electrodes 520b, 520a on the other side, and protrude toward the electrodes 520b, 520a on the other side, respectively. Shrinkage and disappearance of the projection sections 526a, 526b cause flicker or arc-jump. It should be noted that the flicker is a phenomenon that the discharge light flickers due to the irregular migration of the origin of the arc, and the arc-jump is a phenomenon that the origin of the arc migrates to increase the arc length, thereby reducing the illuminance of the discharge light.

Figure 4:
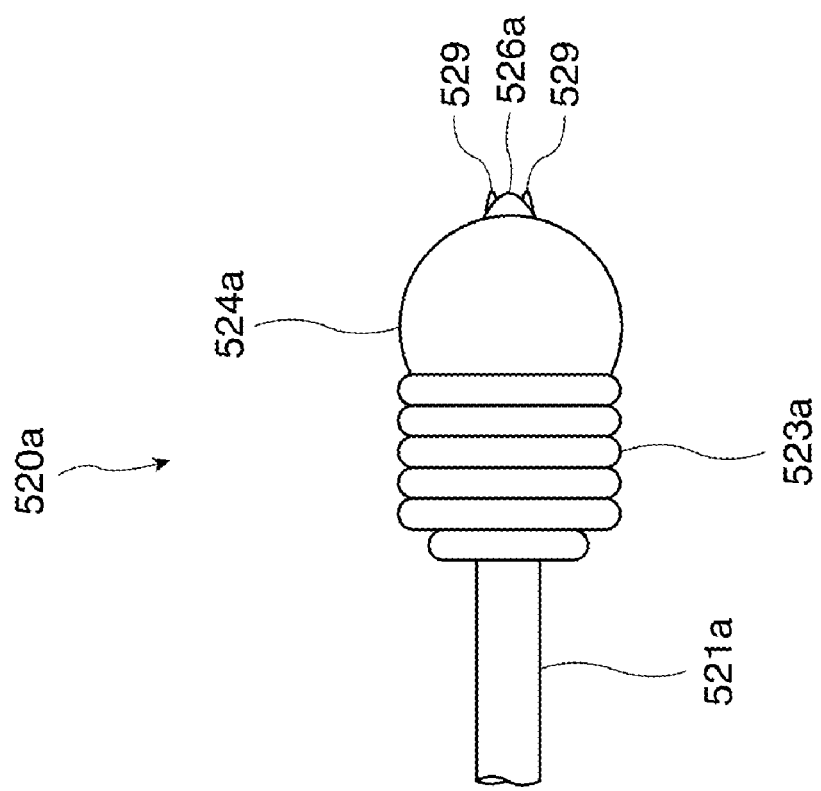
FIG. 4 is an explanatory diagram showing an appearance of the electrode provided with irregular sections.

FIG. 4 is an explanatory diagram showing an appearance of the electrode 520a provided with irregular sections 529. Although FIG. 4 shows the appearance of the electrode 520a provided with the irregular sections 529, the electrode 520b is also provided with the irregular sections 529. In general, as the accumulated time during which the discharge lamp 500 is lighted increases, the irregular sections 529 smaller than the projection sections 526a, 526b are formed on the surfaces of the projection sections 526a, 526b of the electrodes 520a, 520b, respectively. If the projection sections 526a, 526b are deformed due to the irregular sections 529, the origin of the arc generated between the electrodes 520a, 520b shifted to the irregular sections 529, thus the flicker or the arc-jump might be caused.

Going back to the explanation of FIG. 3, even in the case in which the electrodes 520a, 520b are deformed due to the shrinkage of the projection sections 526a, 526b or the formation of the irregular sections 529, the surfaces of the peripheries of the projection sections 526a, 526b are melted due to heat generation caused by the arc discharge, thereby repairing the electrodes 520a, 520b, respectively. By the repetition of the deformation and the repair of the electrodes 520a, 520b described above, the interelectrode distance DE between the electrode 520a and the electrode 520b is apt to increase, as the accumulated time during with the discharge lamp 500 is lighted increases, while repeating increase and decrease. As the interelectrode distance increases, the lamp voltage as the voltage between the electrode 520a and the electrode 520b also increases.

A3. Detailed Configuration of Driving Device

Figure 5:
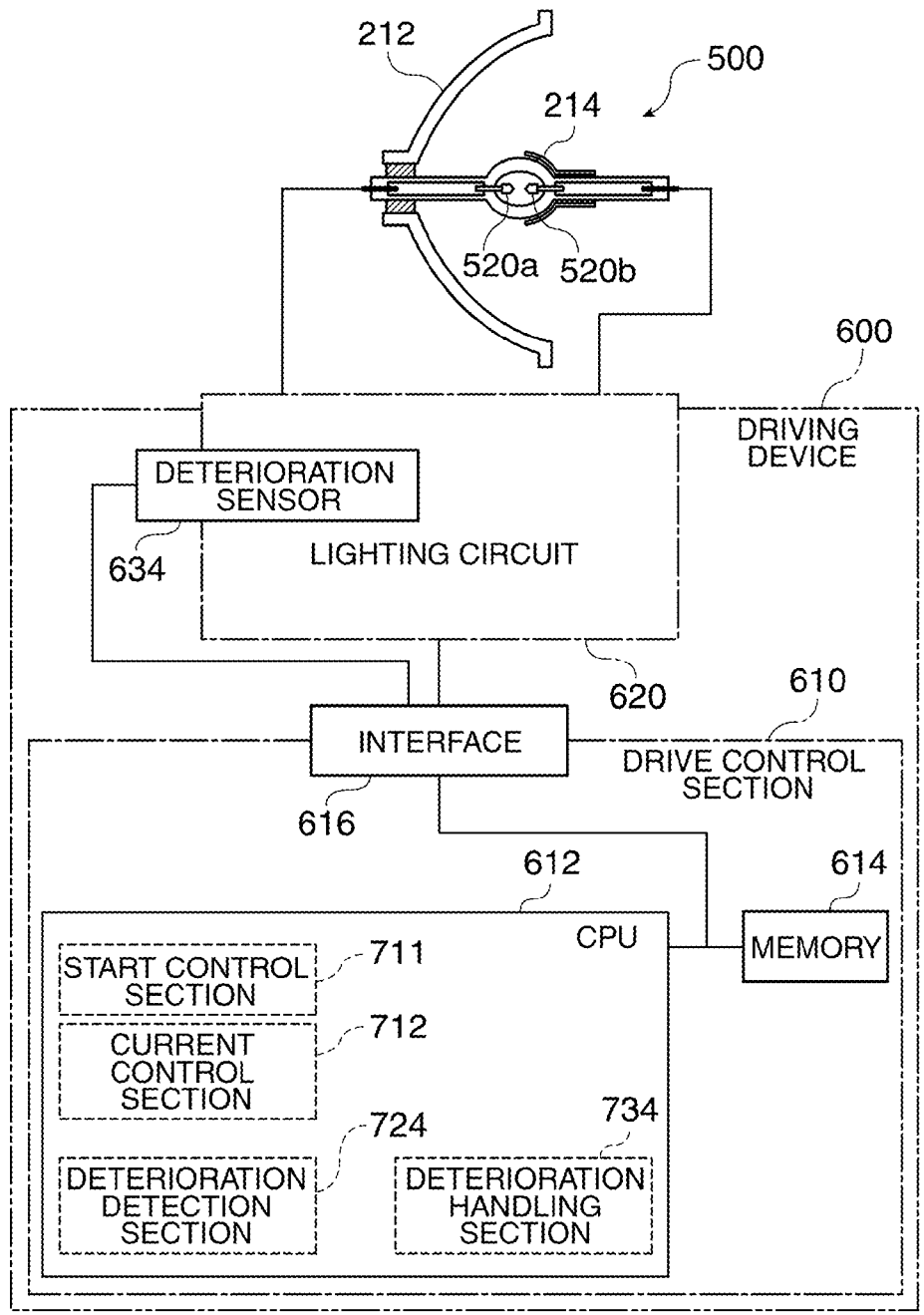
FIG. 5 is an explanatory diagram mainly showing a detailed configuration of a driving device in the light source device.

FIG. 5 is an explanatory diagram mainly showing a detailed configuration of a driving device 600 in the light source device 20. The driving device 600 is provided with a drive control section 610, a lighting circuit 620, and a deterioration sensor 634.

The lighting circuit 620 of the driving device 600 is an electric circuit provided with an igniter circuit for starting the discharge lamp 500, and an inverter circuit for generating an alternating current for driving the discharge lamp 500, and supplies the electrodes 520a, 520b of the discharge lamp 500 with the alternating circuit based on an instruction from the drive control section 610.

The drive control section 610 of the driving device 600 is an electric circuit for controlling the operation of the lighting circuit 620, and is provided with a start control section 711, a current control section 712, a deterioration detection section 724, and a deterioration handling section 734.

The start control section 711 of the drive control section 610 outputs a control signal to the lighting circuit 620, thereby performing the control for starting the discharge lamp 500. After the discharge lamp 500 is started by the start control section 711, the current control section 712 of the drive control section 610 outputs a control signal to the lighting circuit 620, thereby controlling the alternating current supplied from the lighting circuit 620.

Figure 6:
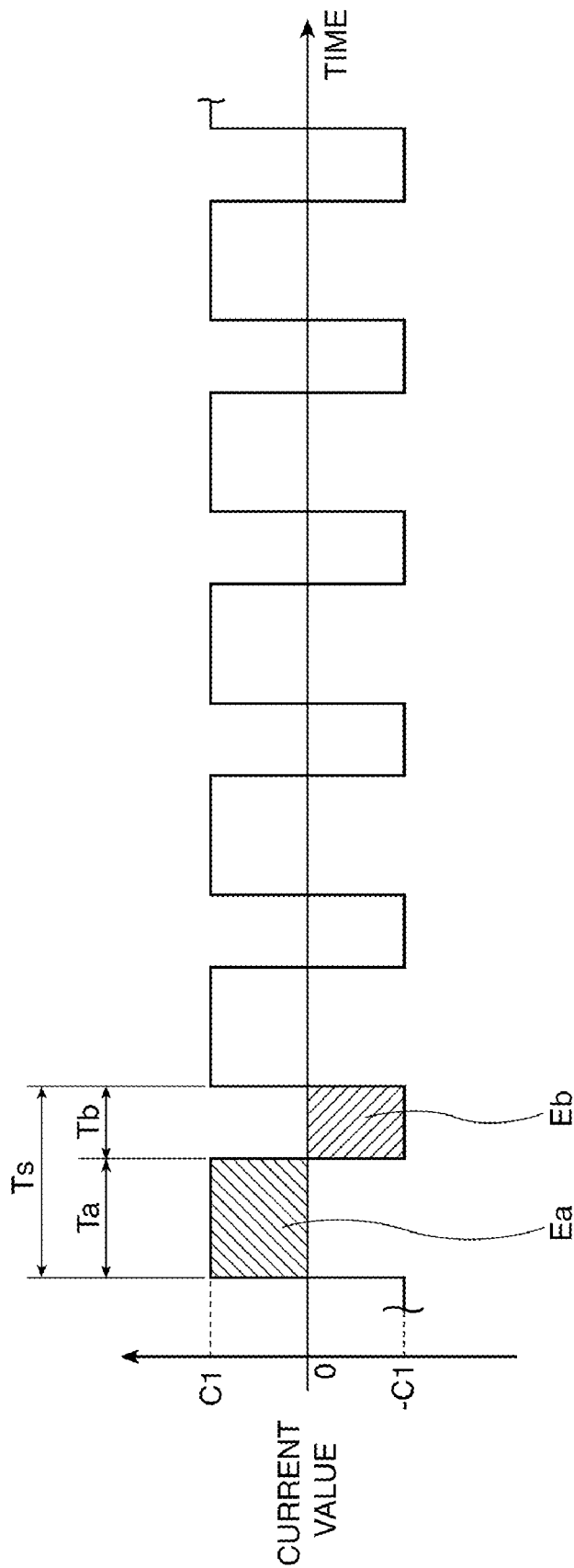
FIG. 6 is an explanatory diagram showing an example of an alternating current supplied to the electrode.

FIG. 6 is an explanatory diagram showing an example of the alternating current supplied to the electrode 520a. FIG. 6 shows an alternating current to be supplied to the electrode 520a taking a positive value as the current value with which the electrode 520a acts as the anode, and taking a negative value as the current value with which the electrode 520a acts as the cathode. In the period during which the electrode 520a acts as the anode, the electrode 520b acts as the cathode, and in the period during which the electrode 520a acts as the cathode, the electrode 520b acts as the anode. In other words, the alternating current supplied to the electrode 520b shows an appearance obtained by inverting the polarity of the alternating current supplied to the electrode 520a.

As shown in FIG. 6, the alternating current supplied to the electrodes 520a, 520b are each a rectangular wave having the polarity regularly switched between a positive current value "C1" and a negative current value "−C1" with the same absolute values and the polarities different from each other. In the present embodiment, the polarity switching period Is with which the polarity of the alternating current is switched alternately is constant. In the present embodiment, the anode period Ta during which the electrode 520a acts as the anode is longer than the anode period Tb during which the electrode 520b acts as the anode in the initial state in which the life expectancy of the electrodes 520a, 520b exceeds a half of the estimated life, and the anode duty ratio as the ratio of the anode period Ta of the electrode 520a with respect to the polarity switching period Ts is 60%. In other words, the anode duty ratio of the electrode 520b in the initial state is 40%. In the present embodiment, the anode power energy Ea supplied thereto during the period in which the electrode 520a acts as the anode is greater than the anode power energy Eb supplied thereto during the period in which the electrode 520b acts as the anode in the initial state.

Going back to the explanation of FIG. 5, the deterioration detection section 724 of the drive control section 610 detects the degree of progression of the deterioration in the electrodes 520a, 520b based on an output signal from the deterioration sensor 634. The deterioration handling section 734 of the drive control section 610 increases the anode power energy Eb, which is supplied thereto during the period in which the electrode 520b acts as the anode, in accordance with the degree of progression of the deterioration thus detected by the deterioration detection section 724. Details of the operation of the drive control section 610 will be described later.

In the present embodiment, the drive control section 610 is provided with a central processing unit (hereinafter abbreviated as CPU) 612 for executing various arithmetic processing, a memory 614 for storing data to be processed by the CPU 612, and an interface 616 for communicating the data with the outside of the drive control section 610. In the present embodiment, although the functions of the start control section 711, the current control section 712, the deterioration detection section 724, and the deterioration handling section 734 are realized by the CPU 612 operating in accordance with software stored in the memory 614, they can also be realized by an electronic circuit of the drive control section 610 operating based on the physical circuit configuration thereof as another embodiment.

A4. Operation of Projector

Figure 7:
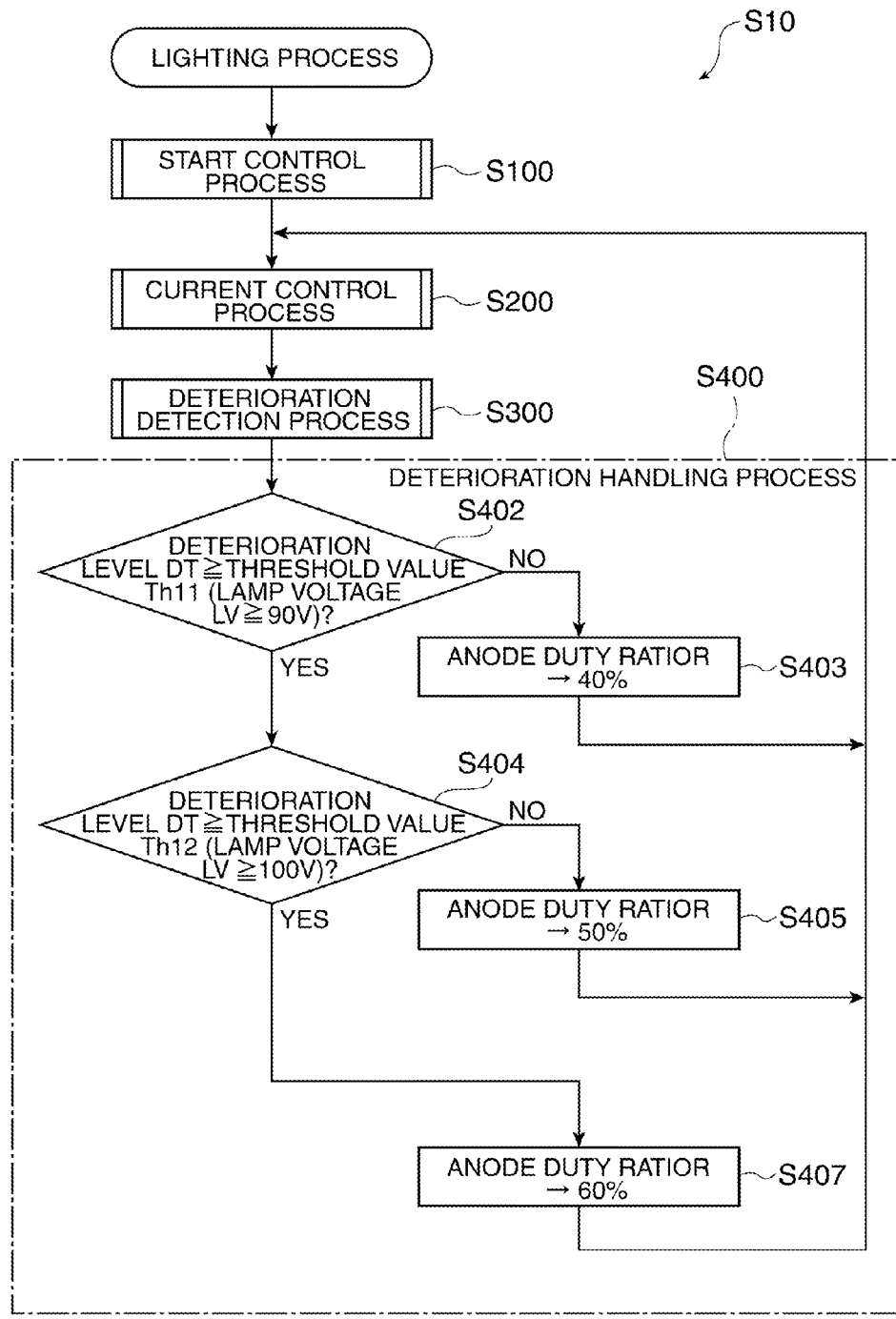
FIG. 7 is a flowchart showing a lighting process executed by the driving device.

FIG. 7 is a flowchart showing the lighting process (step S10) executed by the driving device 600. The lighting process (step S10) is a process for lighting the discharge lamp 500. In the present embodiment, the drive control section 610 of the driving device 600 starts the lighting process (step S10) when the projector 10 is powered on.

When the drive control section 610 starts the lighting process (step S10), the CPU 612 acts as the start control section 711, thereby executing a start control process (step S100). In the start control process (step S100), the drive control section 610 outputs the control signal to the lighting circuit 620, thereby performing the control for starting the discharge lamp 500.

After the discharge lamp 500 is started by the start control process (step S100), the drive control section 610 acts as the current control section 712, thereby executing a current control process (step S200). In the current control process (step S200), the drive control section 610 outputs the control signal to the lighting circuit 620, thereby controlling the alternating current supplied from the lighting circuit 620.

While the current control process (step S200) controls the alternating current supplied from the lighting circuit 620, the drive control section 610 acts as the deterioration detection section 724, thereby executing a deterioration detection process (step S300). In the deterioration detection process (step S300), the drive control section 610 detects the degree of progression of the deterioration in the electrodes 520a, 520b based on the output signal from the deterioration sensor 634.

In the present embodiment, the deterioration sensor 634 is a voltage sensor for detecting the lamp voltage between the electrodes 520a, 520b, and the drive control section 610 detects the degree of progression of the deterioration in the electrodes 520a, 520b based on the lamp voltage between the electrodes 520a, 520b. In general, the tip portions of the electrodes 520a, 520b are consumed as the accumulated time during which the discharge lamp 500 is lighted increases. If the tip portions of the electrodes 520a, 520b are consumed, the interelectrode distance DE between the electrodes 520a, 520b increases, and the lamp voltage LV between the electrodes 520a, 520b rises.

In another embodiment, it is also possible that the drive control section 610 detects the degree of progression of the deterioration in the electrodes 520a, 520b based on the variation of the current in the electrodes 520a, 520b using a current sensor for the deterioration sensor 634. Further, it is also possible for the drive control section 610 to detect the degree of progression of the deterioration in the electrodes 520a, 520b based on occurrence of the flickers in the electrodes 520a, 520b using a flicker sensor for the deterioration sensor 634. Further, it is also possible for the drive control section 610 to detect the degree of progression of the deterioration in the electrodes 520a, 520b based on a variation in the illuminance of the discharge light emitted from the discharge lamp 500 using an illuminance sensor for the deterioration sensor 634. Further, it is also possible for the drive control section 610 to detect the degree of progression of the deterioration in the electrodes 520a, 520b based on image analysis using an image pickup sensor for the deterioration sensor 634.

After the deterioration detection process (step S300), the drive control section 610 acts as the deterioration handling section 734, thereby executing a deterioration handling process (step S400). In the deterioration handling process (step S400), the drive control section 610 increases the anode power energy Eb, which is supplied thereto during the period in which the electrode 520b acts as the anode, in accordance with the degree of progression of the deterioration thus detected by the deterioration detection process (step S300).

When starting the deterioration handling process (step S400), the drive control section 610 determines whether or not the deterioration level DT representing the degree of progression of the deterioration detected by the deterioration detection process (step S300) is equal to or greater than a threshold value Th11 (step S402). In the present embodiment, the deterioration level DT is represented by the lamp voltage LV in the electrodes 520a, 520b, and the threshold value Th11 is set to be 90 volts (V).

If the deterioration level DT is smaller than the threshold value Th11, namely the lamp voltage LV is lower than 90 volts ("NO" in the step S402), the drive control section 610 sets the anode duty ratio of the electrode 520b to be 40% (step S403), and then terminates the deterioration handling process (step S400). Subsequently, in the current control process (step S200), the drive control section 610 controls the alternating current supplied from the lighting circuit 620 to the electrodes 520a, 520b so that the anode duty ratio of the electrode 520b becomes 40%. Thus, "(the anode period Ta of the electrode 520a):(the anode period Tb of the electrode 520b)=6:4" is assured, and the anode power energy Eb becomes smaller than the anode power energy Ea.

On the other hand, in the case in which the deterioration level DT is equal to or greater than the threshold value Th11, namely the lamp voltage LV is equal to or higher than 90 volts ("YES" in the step S402), the drive control section 610 determines whether or not the deterioration level DT representing the degree of progression of the deterioration detected by the deterioration detection process (step S300) is equal to or greater than a threshold value Th12, which is greater than the threshold value Th11 (step S404). In the present embodiment, the threshold value Th12 is set to be 100 volts.

If the deterioration level DT is smaller than the threshold value Th12, namely the lamp voltage LV is lower than 100 volts ("NO" in the step S404), the drive control section 610 sets the anode duty ratio of the electrode 520b to be 50% (step S405), and then terminates the deterioration handling process (step S400). Subsequently, in the current control process (step S200), the drive control section 610 controls the alternating current supplied from the lighting circuit 620 to the electrodes 520a, 520b so that the anode duty ratio of the electrode 520b becomes 50%. Thus, "(the anode period Ta of the electrode 520a):(the anode period Tb of the electrode 520b)=5:5" is assured, and the anode power energy Eb becomes substantially equal to the anode power energy Ea.

On the other hand, if the deterioration level DT is equal to or greater than the threshold value Th12, namely the lamp voltage LV is equal to or higher than 100 volts ("YES" in the step S404), the drive control section 610 sets the anode duty ratio of the electrode 520b to be 60% (step S407), and then terminates the deterioration handling process (step S400). Subsequently, in the current control process (step S200), the drive control section 610 controls the alternating current supplied from the lighting circuit 620 to the electrodes 520a, 520b so that the anode duty ratio of the electrode 520b becomes 60%. Thus, "(the anode period Ta of the electrode 520a):(the anode period Tb of the electrode 520b)=4:6" is assured, and the anode power energy Eb becomes greater than the anode power energy Ea.

Figure 8:
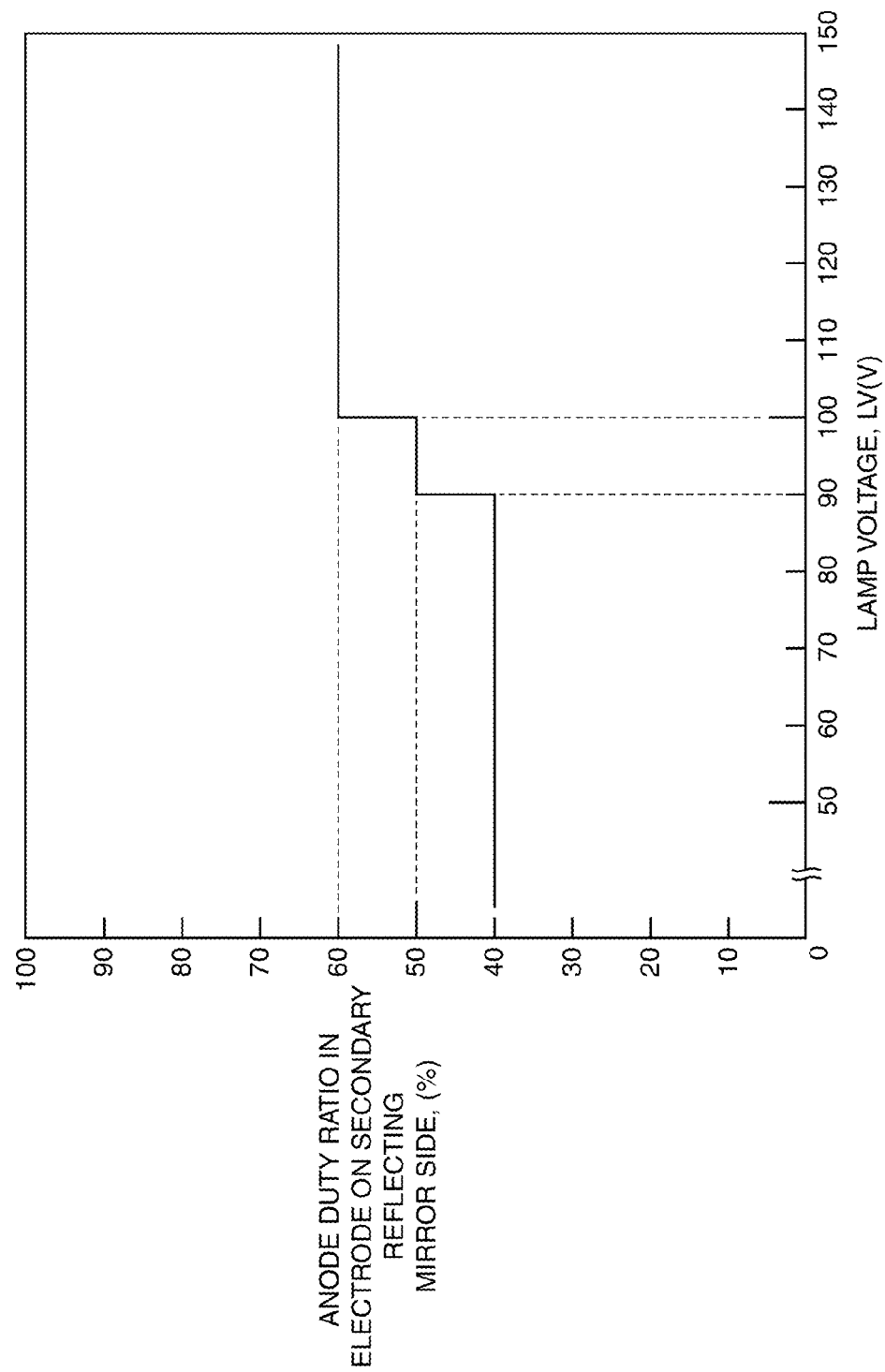
FIG. 8 is an explanatory diagram showing a relationship between an anode duty ratio of the alternating current controlled by a deterioration handling process and a lamp voltage.

FIG. 8 is an explanatory diagram showing a relationship between the anode duty ratio of the alternating current controlled by the deterioration handling process (step S400) and the lamp voltage LV. In FIG. 8, the lateral axis represents the lamp voltage LV between the electrodes 520a, 520b, and the vertical axis represents the anode duty ratio of the electrode 520b. As shown in FIG. 8, the anode duty ratio of the electrode 520b is 40% if the lamp voltage LV is lower than 90 volts, 50% if the lamp voltage LV is equal to or higher than 90 volts and lower than 100 volts, or 60% if the lamp voltage LV is higher than 100 volts. Thus, the anode power energy Eb is smaller than the anode power energy Ea if the lamp voltage LV is lower than 90 volts, substantially equal to the anode power energy Ea if the lamp voltage LV is equal to or higher than 90 volts and lower than 100 volts, or greater than the anode power energy Ea if the lamp voltage LV is higher than 100 volts.

As a result of the deterioration handling process (step S400), in the initial state in which the lamp voltage LV is lower than 90 volts, the amount of heat generation in the electrode 520b on the side of the secondary reflecting mirror 214 is reduced, and thus the excessive melting of the electrode 520b can be prevented. Subsequently, in the middle state in which the deterioration in the electrodes 520a, 520b is advanced to make the lamp voltage LV equal to or higher than 90 volts and lower than 100 volts, the amount of heat generation in the electrode 520b is increased to be greater than that in the initial state, and thus the insufficient melting of the electrode 520b can be prevented. Subsequently, in the terminal state in which the deterioration in the electrodes 520a, 520b is further advanced to make the lamp voltage LV higher than 100 volts, the amount of heat generation in the electrode 520b is further increased to be greater than that in the middle state, and thus it is achieved to keep the projection 526b on the electrode 520b.

A5. Advantages

According to the driving device 600 explained hereinabove, the amount of heat generated in the electrode 520b on the side of the secondary reflecting mirror 214 is increased in accordance with the degree of progression of the deterioration in the electrodes 520a, 520b, and thus the progression of the deterioration due to the insufficient melting in the electrode 520b can be prevented. As a result, longer operating life of the discharge lamp 500 can be achieved.

Further, since the anode power energy Eb is increased from the initial state (step S403) of being smaller than the anode power energy Ea in accordance with the deterioration level DT (steps S405, S407), it is possible to prevent the deterioration of the electrode 520b due to the excessive melting in the initial stage of the product life cycle. Further, since the anode power energy Eb is increased from the state of being smaller than the anode power energy Ea to the state of being greater than the anode power energy Ea in accordance with the deterioration level DT (steps S403, S407), prevention of the excessive melting and the insufficient melting in the electrode 520b can efficiently be performed.

B. FIRST MODIFIED EXAMPLE

The driving device 600 of the first modified example is substantially the same as in the embodiment described above except the point that the control of the alternating current in the case in which the deterioration level DT is equal to or higher than the threshold value Th12 is different therefrom.

Figure 9:
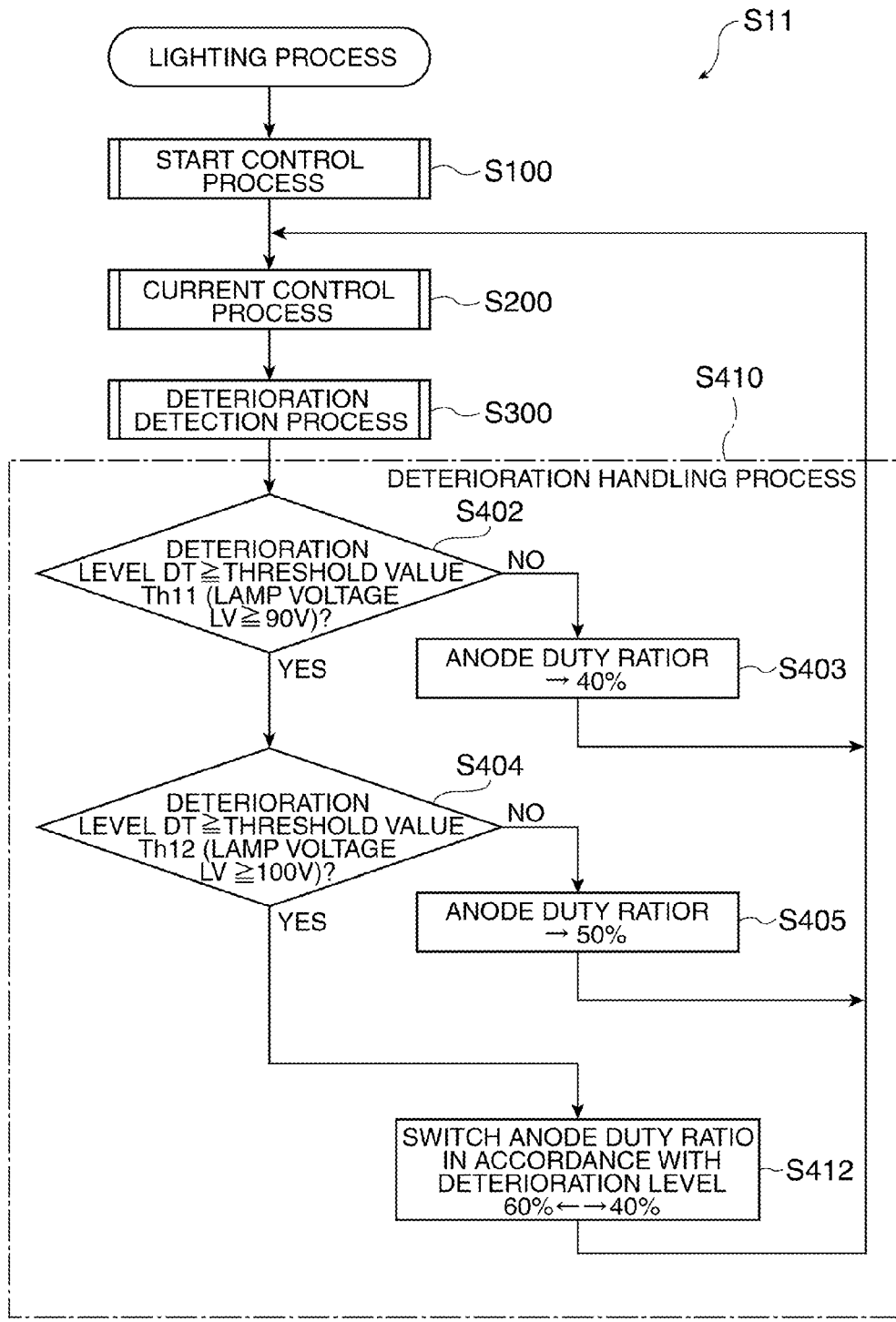
FIG. 9 is a flowchart showing a lighting process executed by the driving device of a first modified example.

FIG. 9 is a flowchart showing the lighting process (step S11) executed by the driving device 600 of the first modified example. The lighting process (step S11) in the first modified example is substantially the same as the lighting process (step S10) shown in FIG. 7 except the point that the deterioration handling process (step S410) is executed instead of the deterioration handling process (step S400). The deterioration handling process (step S410) in the first modified example is substantially the same as the deterioration handling process (step S400) shown in FIG. 7 except the point that the process corresponding to the case in which the deterioration level DT is equal to or higher than the threshold value Th12 is different.

In the deterioration handling process (step S410), if the deterioration level DT is equal to or greater than the threshold value Th12, namely if the lamp voltage LV is equal to or higher than 100 volts ("YES" in the step S404), the drive control section 610 sets the anode duty ratio of the electrode 520b so as to be alternately switched between 60% and 40% in accordance with the deterioration level DT (step S412), and then terminates the deterioration handling process (step S410). Subsequently, in the current control process (step S200), the drive control section 610 controls the alternating current supplied from the lighting circuit 620 to the electrodes 520a, 520b so that the anode duty ratio of the electrode 520b becomes 60% or 40%. Thus, if the anode duty ratio of the electrode 520b is set to be 60%, "(the anode period Ta of the electrode 520a):(the anode period Tb of the electrode 520b) =4:6" is realized, and the anode power energy Eb becomes greater than the anode power energy Ea, and if the anode duty ratio of the electrode 520b is set to be 40%, "(the anode period Ta of the electrode 520a):(the anode period Tb of the electrode 520b)=6:4" is realized, and the anode power energy Eb becomes smaller than the anode power energy Ea.

Figure 10:
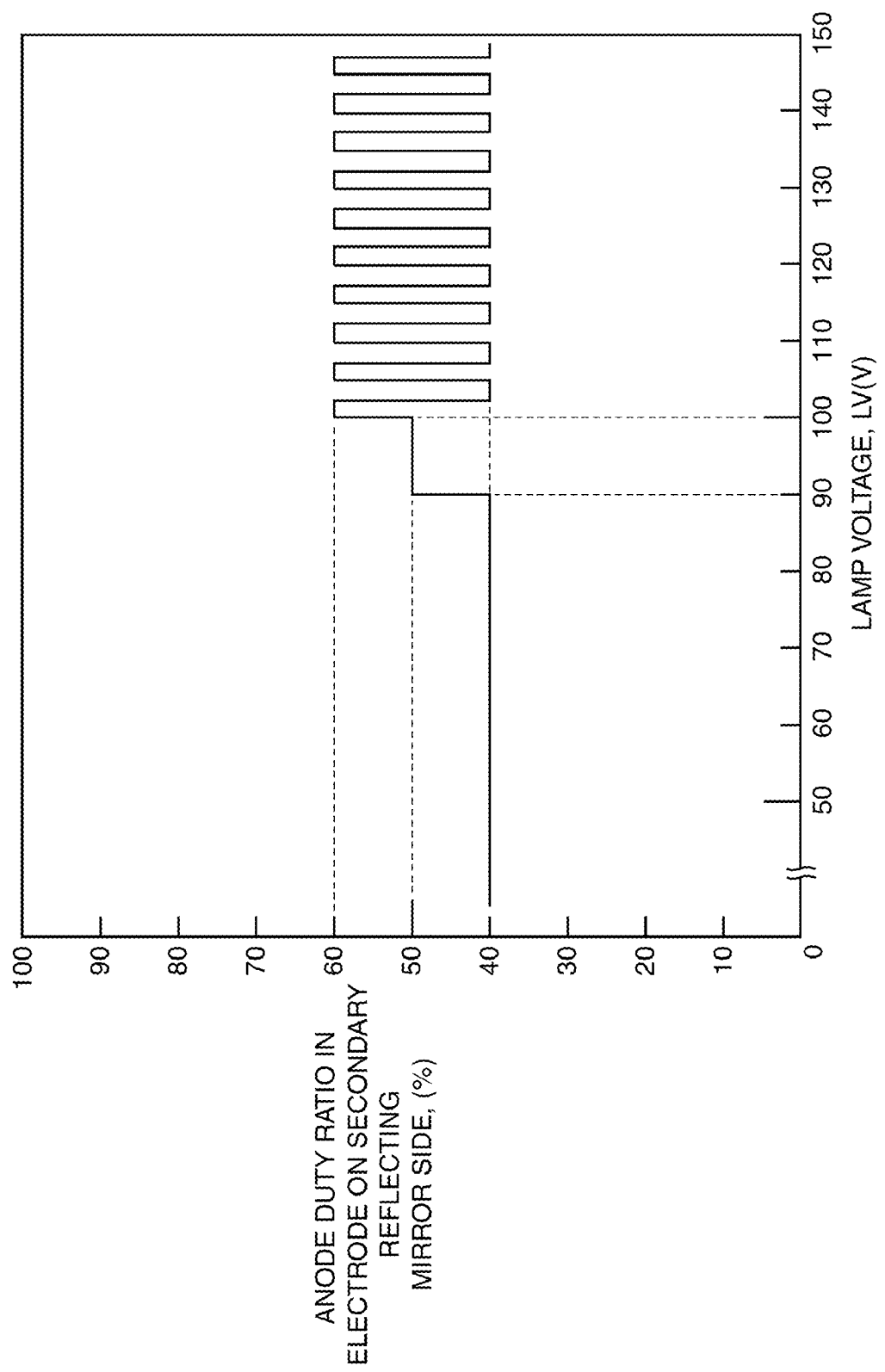
FIG. 10 is an explanatory diagram showing a relationship between the anode duty ratio of the alternating current controlled by the deterioration handling process in the first modified example and the lamp voltage.

FIG. 10 is an explanatory diagram showing a relationship between the anode duty ratio of the alternating current controlled by the deterioration handling process (step S410) in the first modified example and the lamp voltage LV. In FIG. 10, the lateral axis represents the lamp voltage LV between the electrodes 520a, 520b, and the vertical axis represents the anode duty ratio of the electrode 520b. As shown in FIG. 10, the anode duty ratio of the electrode 520b is 40% if the lamp voltage LV is lower than 90 volts, 50% if the lamp voltage LV is equal to or higher than 90 volts and lower than 100 volts, or switched alternately between 60% and 40% in accordance with the lamp voltage LV if the lamp voltage LV is equal to or higher than 100 volts. Thus, the anode power energy Eb is smaller than the anode power energy Ea if the lamp voltage LV is lower than 90 volts, substantially equal to the anode power energy Ea if the lamp voltage LV is equal to or higher than 90 volts and lower than 100 volts, or repeatedly takes the state of being greater than the anode power energy Ea and the state of being smaller than the anode power energy Ea alternately if the lamp voltage LV is equal to or higher than 100 volts. In the present embodiment, it is arranged that, if the lamp voltage LV is equal to or higher than 100 volts, the area in which the anode duty ratio of the electrode 520b is set to be 60% and the area in which the anode duty ratio of the electrode 520b is set to be 40% are switched every time the lamp voltage LV increases an interval of 2 through 5 volts.

As a result of the deterioration handling process (step S410), in the initial state in which the lamp voltage LV is lower than 90 volts, the amount of heat generation in the electrode 520b on the side of the secondary reflecting mirror 214 is reduced, and thus the excessive melting of the electrode 520b can be prevented. Subsequently, in the middle state in which the deterioration in the electrodes 520a, 520b is advanced to make the lamp voltage LV equal to or higher than 90 volts and lower than 100 volts, the amount of heat generation in the electrode 520b is made greater than that in the initial state, and thus the insufficient melting of the electrode 520b can be prevented. Subsequently, in the terminal state in which the deterioration in the electrodes 520a, 520b is further advanced to make the lamp voltage LV equal to or higher than 100 volts, the amount of heat generation in the electrode 520b on the side of the secondary reflecting mirror 214 is further increased to be larger than in the middle state, thus it is achieved to keep the projection section 526b on the electrode 520b, and at the same time, the amount of heat generation in the electrode 520a on the side of the primary reflecting mirror 212 is further increased to be larger than in the middle state, thus it is also achieved to keep the projection section 526a on the electrode 520a.

According to the driving device 600 of the first modified example explained hereinabove, the amount of heat generated in the electrode 520b on the side of the secondary reflecting mirror 214 is increased in accordance with the degree of progression of the deterioration in the electrodes 520a, 520b, and thus the progression of the deterioration due to the insufficient melting in the electrode 520b can be prevented. As a result, longer operating life of the discharge lamp 500 can be achieved. Further, since the anode power energy Ea, Eb is switched between a larger value and a smaller value alternately in accordance with the deterioration level DT, thereby increasing the anode power energy Eb in accordance with the deterioration level DT (step S412), it is possible to prevent the insufficient melting in the electrode 520a on the side of the primary reflecting mirror 212 caused by increasing the anode power energy Eb and reducing the anode power energy Ea.

C. SECOND MODIFIED EXAMPLE

The driving device 600 of the second modified example is substantially the same as in the embodiment described above except the point that the control of the alternating current is different.

Figure 11:
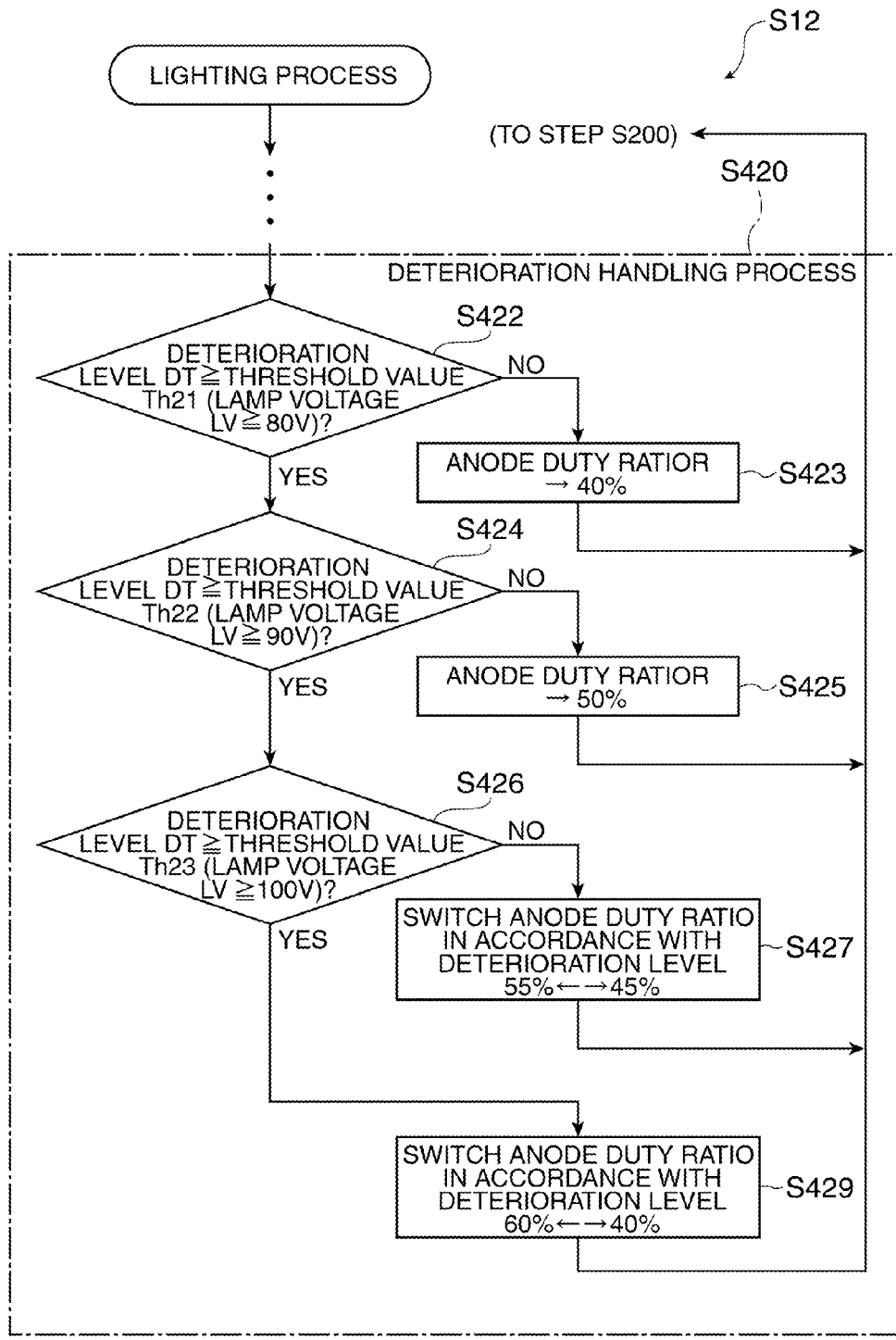
FIG. 11 is a flowchart showing a lighting process executed by the driving device of a second modified example.

FIG. 11 is a flowchart showing the lighting process (step S12) executed by the driving device 600 of the second modified example. The lighting process (step S12) in the second modified example is substantially the same as the lighting process (step S10) shown in FIG. 7 except the point that the deterioration handling process (step S420) is executed instead of the deterioration handling process (step S400).

When starting the deterioration handling process (step S420), the drive control section 610 determines whether or not the deterioration level DT representing the degree of progression of the deterioration detected by the deterioration detection process (step S300) is equal to or greater than a threshold value Th21 (step S422). In the second modified example, the degradation level DT is represented by the lamp voltage LV in the electrodes 520a, 520b, and the threshold value Th21 is set to be 80 volts.

If the deterioration level DT is smaller than the threshold value Th21, namely the lamp voltage LV is lower than 80 volts ("NO" in the step S422), the drive control section 610 sets the anode duty ratio of the electrode 520b to be 40% (step S423), and then terminates the deterioration handling process (step S420). Subsequently, in the current control process (step S200), the drive control section 610 controls the alternating current supplied from the lighting circuit 620 to the electrodes 520a, 520b so that the anode duty ratio of the electrode 520b becomes 40%. Thus, "(the anode period Ta of the electrode 520a):(the anode period Tb of the electrode 520b)=6:4" is realized, and the anode power energy Eb becomes smaller than the anode power energy Ea.

On the other hand, in the case in which the deterioration level DT is equal to or greater than the threshold value Th21, namely the lamp voltage LV is equal to or higher than 80 volts ("YES" in the step S422), the drive control section 610 determines whether or not the deterioration level DT representing the degree of progression of the deterioration detected by the deterioration detection process (step S300) is equal to or greater than a threshold value Th22, which is greater than the threshold value Th21 (step S424). In the second modified example, the threshold value Th22 is set to be 90 volts.

If the deterioration level DT is smaller than the threshold value Th22, namely the lamp voltage LV is lower than 90 volts ("NO" in the step S424), the drive control section 610 sets the anode duty ratio of the electrode 520b to be 50% (step S425), and then terminates the deterioration handling process (step S420). Subsequently, in the current control process (step S200), the drive control section 610 controls the alternating current supplied from the lighting circuit 620 to the electrodes 520a, 520b so that the anode duty ratio of the electrode 520b becomes 50%. Thus, "(the anode period Ta of the electrode 520a):(the anode period Tb of the electrode 520b)=5:5" is realized, and the anode power energy Eb becomes substantially equal to the anode power energy Ea.

On the other hand, in the case in which the deterioration level DT is equal to or greater than the threshold value Th22, namely the lamp voltage LV is equal to or higher than 90 volts ("YES" in the step S424), the drive control section 610 determines whether or not the deterioration level DT representing the degree of progression of the deterioration detected by the deterioration detection process (step S300) is equal to or greater than a threshold value Th23, which is greater than the threshold value Th22 (step S426). In the second modified example, the threshold value Th23 is set to be 100 volts (V).

If the deterioration level DT is smaller than the threshold value Th23, namely the lamp voltage LV is lower than 100 volts ("NO" in the step S426), the drive control section 610 sets the anode duty ratio of the electrode 520b so as to be alternately switched between 55% and 45% in accordance with the deterioration level DT (step S427), and then terminates the deterioration handling process (step S420). Subsequently, in the current control process (step S200), the drive control section 610 controls the alternating current supplied from the lighting circuit 620 to the electrodes 520a, 520b so that the anode duty ratio of the electrode 520b becomes 55% or 45%. Thus, if the anode duty ratio of the electrode 520b is set to be 55%, "(the anode period Ta of the electrode 520a): (the anode period Tb of the electrode 520b)=45:55" is realized, and the anode power energy Eb becomes greater than the anode power energy Ea, and if the anode duty ratio of the electrode 520b is set to be 45%, "(the anode period Ta of the electrode 520a):(the anode period Tb of the electrode 520b) =55:45" is realized, and the anode power energy Eb becomes smaller than the anode power energy Ea.

If the deterioration level DT is equal to or greater than the threshold value Th23, namely the lamp voltage LV is equal to or higher than 100 volts ("YES" in the step S426), the drive control section 610 sets the anode duty ratio of the electrode 520b so as to be alternately switched between 60% and 40% in accordance with the deterioration level DT (step S429), and then terminates the deterioration handling process (step S420). Subsequently, in the current control process (step S200), the drive control section 610 controls the alternating current supplied from the lighting circuit 620 to the electrodes 520a, 520b so that the anode duty ratio of the electrode 520b becomes 60% or 40%. Thus, if the anode duty ratio of the electrode 520b is set to be 60%, "(the anode period Ta of the electrode 520a):(the anode period Tb of the electrode 520b) =4:6" is realized, and the anode power energy Eb becomes greater than the anode power energy Ea, and if the anode duty ratio of the electrode 520b is set to be 40%, "(the anode period Ta of the electrode 520a):(the anode period Tb of the electrode 520b)=6:4" is realized, and the anode power energy Eb becomes smaller than the anode power energy Ea.

Figure 12:
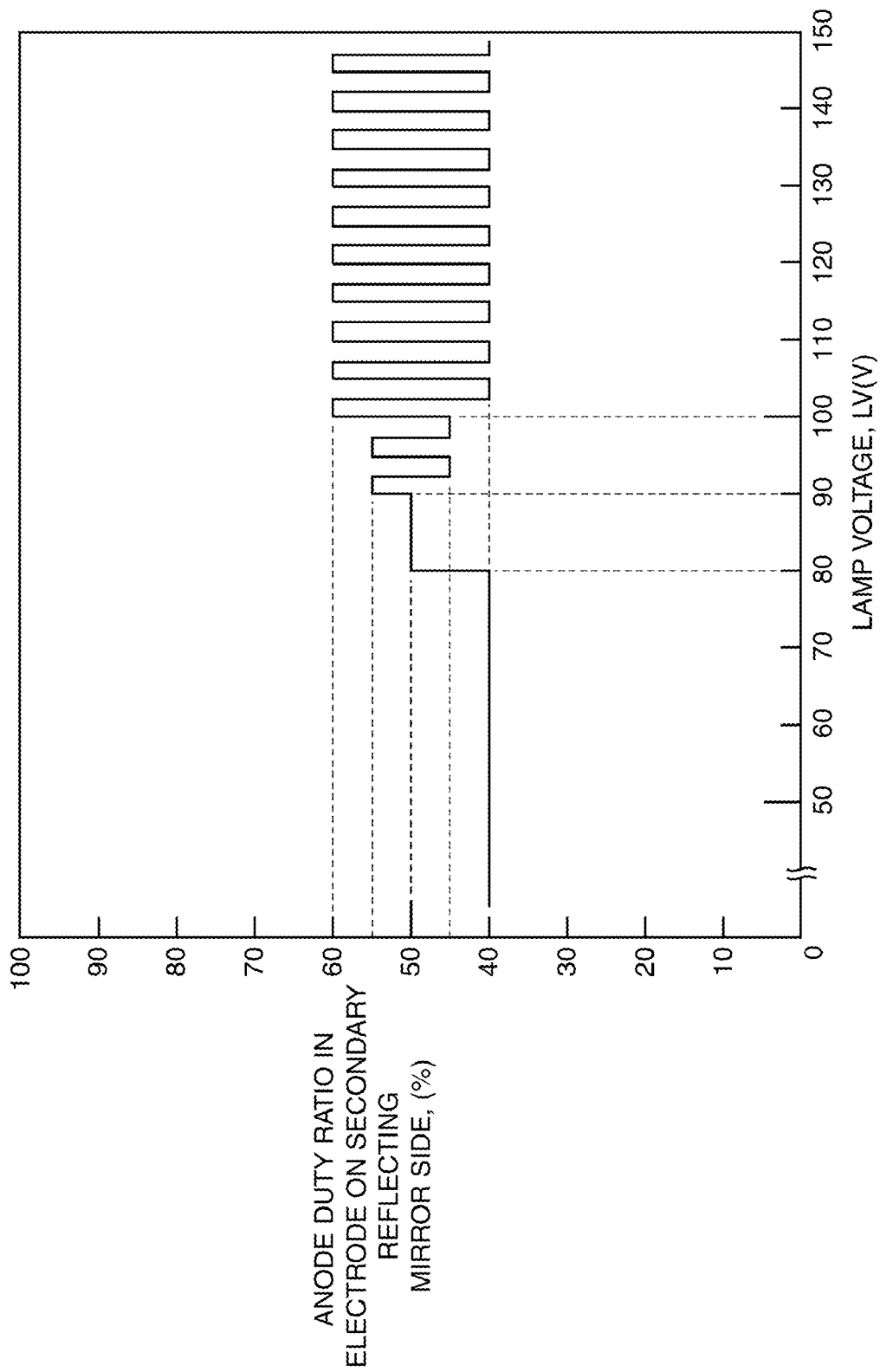
FIG. 12 is an explanatory diagram showing a relationship between the anode duty ratio of the alternating current controlled by the deterioration handling process in the second modified example and the lamp voltage.

FIG. 12 is an explanatory diagram showing a relationship between the anode duty ratio of the alternating current controlled by the deterioration handling process (step S420) in the second modified example and the lamp voltage LV. In FIG. 12, the lateral axis represents the lamp voltage LV between the electrodes 520a, 520b, and the vertical axis represents the anode duty ratio of the electrode 520b. As shown in FIG. 12, the anode duty ratio of the electrode 520b is 40% if the lamp voltage LV is lower than 80 volts, 50% if the lamp voltage LV is equal to or higher than 80 volts and lower than 90 volts, switched alternately between 55% and 45% in accordance with the lamp voltage LV if the lamp voltage LV is equal to or higher than 90 volts and lower than 100 volts, or switched alternately between 60% and 40% in accordance with the lamp voltage LV if the lamp voltage LV is equal to or higher than 100 volts. Thus, the anode power energy Eb is smaller than the anode power energy Ea if the lamp voltage LV is lower than 80 volts, substantially equal to the anode power energy Ea if the lamp voltage LV is equal to or higher than 80 volts and lower than 90 volts, repeatedly takes the state of being greater than the anode power energy Ea and the state of being smaller than the anode power energy Ea alternately if the lamp voltage LV is equal to or higher than 90 volts and lower than 100 volts, or repeatedly takes the state of being greater than the anode power energy Ea and the state of being smaller than the anode power energy Ea alternately with a larger width if the lamp voltage LV is equal to or higher than 100 volts. In the present embodiment, it is arranged that, if the lamp voltage LV is equal to or higher than 90 volts and lower than 100 volts, the area in which the anode duty ratio of the electrode 520b is set to be 55% and the area in which the anode duty ratio of the electrode 520b is set to be 45% are switched every time the lamp voltage LV increases an interval of 2 through 5 volts. In the present embodiment, it is arranged that, if the lamp voltage LV is equal to or higher than 100 volts, the area in which the anode duty ratio of the electrode 520b is set to be 60% and the area in which the anode duty ratio of the electrode 520b is set to be 40% are switched every time the lamp voltage LV increases an interval of 2 through 5 volts.

As a result of the deterioration handling process (step S420), in the initial state in which the lamp voltage LV is lower than 80 volts, the amount of heat generation in the electrode 520b on the side of the secondary reflecting mirror 214 is reduced, and thus the excessive melting of the electrode 520b can be prevented. Subsequently, in a first middle state in which the deterioration in the electrodes 520a, 520b is advanced to make the lamp voltage LV equal to or higher than 80 volts and lower than 90 volts, the amount of heat generation in the electrode 520b is increased to be greater than that in the initial state, and thus the insufficient melting of the electrode 520b can be prevented. Subsequently, in a second middle state in which the deterioration in the electrodes 520a, 520b is advanced to make the lamp voltage LV equal to or higher than 90 volts and lower than 100 volts, the amount of heat generation in the electrode 520b on the side of the secondary reflecting mirror 214 is increased to be greater than that in the first middle state, thus the insufficient melting of the electrode 520b can be prevented, and at the same time, the amount of heat generation in the electrode 520a on the side of the primary reflecting mirror 212 is increased to be greater than that in the first middle state, thus the insufficient melting of the electrode 520a can also be prevented. Subsequently, in the terminal state in which the deterioration in the electrodes 520a, 520b is further advanced to make the lamp voltage LV equal to or higher than 100 volts, the amount of heat generation in the electrode 520b on the side of the secondary reflecting mirror 214 is further increased to be larger than in the second middle state, thus it is achieved to keep the projection section 526b on the electrode 520b, and at the same time, the amount of heat generation in the electrode 520a on the side of the primary reflecting mirror 212 is further increased to be larger than in the second middle state, thus it is also achieved to keep the projection section 526a on the electrode 520a.

According to the driving device 600 of the second modified example explained hereinabove, the amount of heat generated in the electrode 520b on the side of the secondary reflecting mirror 214 is increased in accordance with the degree of progression of the deterioration in the electrodes 520a, 520b, and thus the progression of the deterioration due to the insufficient melting in the electrode 520b can be prevented. As a result, longer operating life of the discharge lamp 500 can be achieved. Further, since the anode power energy Ea, Eb is switched between a larger value and a smaller value alternately in accordance with the deterioration level DT, thereby increasing the anode power energy Eb in accordance with the deterioration level DT (steps S427, S429), it is possible to prevent the insufficient melting in the electrode 520a on the side of the primary reflecting mirror 212 caused by increasing the anode power energy Eb and reducing the anode power energy Ea. Further, since the difference between the larger value and the smaller value of the anode power energy Ea, Eb is increased in accordance with the deterioration level DT (steps S427, S429), the insufficient melting in both of the electrodes 520a, 520b can be prevented in accordance with the deterioration level DT.

D. THIRD MODIFIED EXAMPLE

The driving device 600 of the third modified example is substantially the same as in the embodiment described above except the point that the control of the alternating current in the case in which the deterioration level DT is equal to or higher than the threshold value Th12 is different therefrom.

Figure 13:
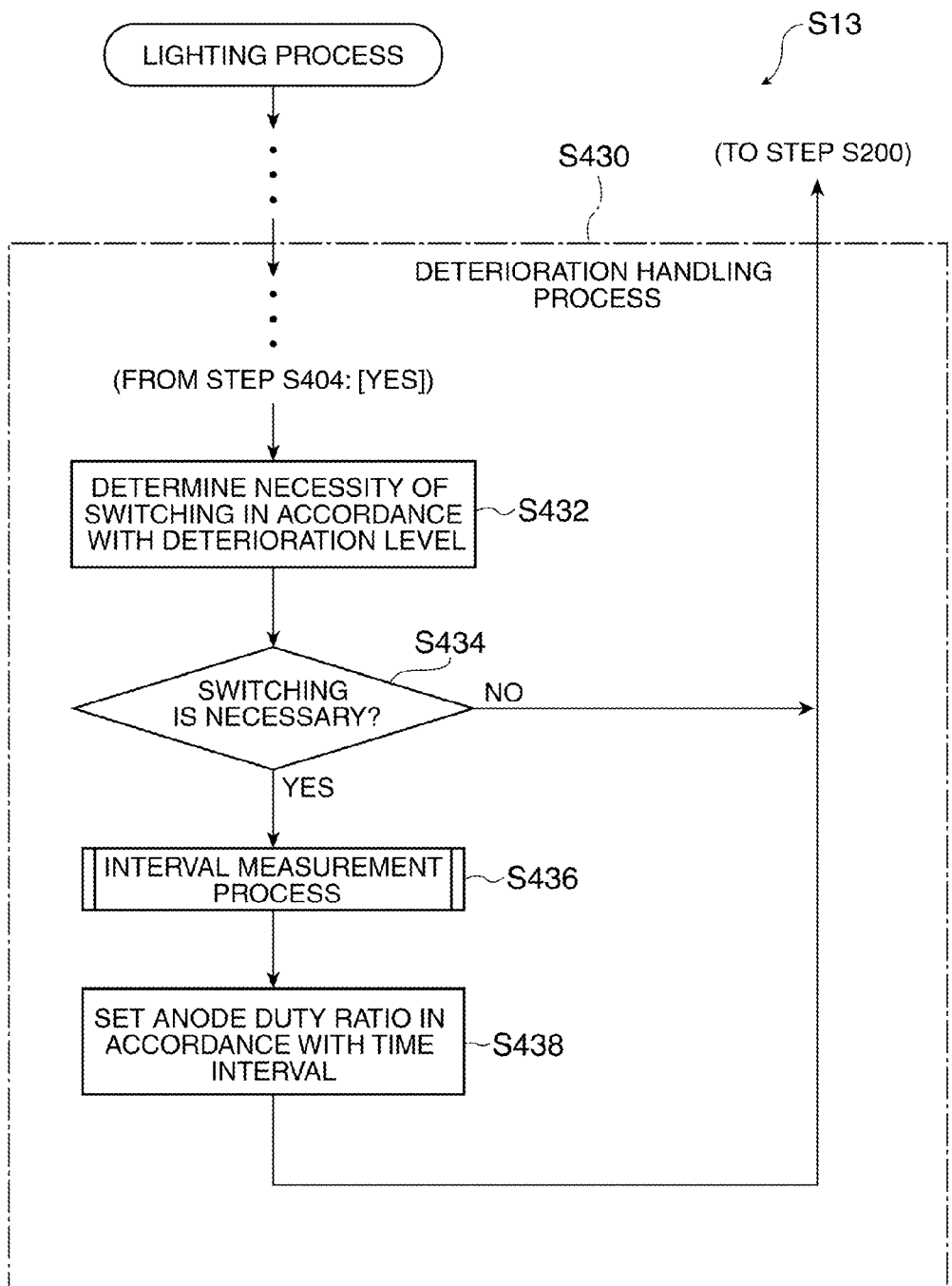
FIG. 13 is a flowchart showing a lighting process executed by the driving device of a third modified example.

FIG. 13 is a flowchart showing the lighting process (step S13) executed by the driving device 600 of the third modified example. The lighting process (step S13) in the third modified example is substantially the same as the lighting process (step S10) shown in FIG. 7 except the point that the deterioration handling process (step S430) is executed instead of the deterioration handling process (step S400). The deterioration handling process (step S430) in the third modified example is substantially the same as the deterioration handling process (step S400) shown in FIG. 7 except the point that the process corresponding to the case in which the deterioration level DT is equal to or higher than the threshold value Th12 is different.

In the deterioration handling process (step S430), if the deterioration level DT is equal to or greater than the threshold value Th12, namely the lamp voltage LV is equal to or higher than 100 volts ("YES" in the step S404), the drive control section 610 determines (step S432) whether or not the anode duty ratio of the electrode 520b should be switched between a state of being higher than 50% and a state of being lower than 50% in accordance with the deterioration level DT detected by the deterioration detection process (step S300). In the present embodiment, it is arranged that, if the lamp voltage LV is equal to or higher than 100 volts, the area in which the anode duty ratio of the electrode 520b is set to be a value larger than 50% and the area in which the anode duty ratio of the electrode 520b is set to be a value smaller than 50% are switched every time the lamp voltage LV increases an interval of 2 through 5 volts.

When switching the anode duty ratio of the electrode 520b between the state of being larger than 50% and the state of being smaller than 50% ("YES" in the step S434), the drive control section 610 executes an interval measurement process (step S436) with the CPU 612 acting as an interval measurement section. In the interval measurement process (step S436), the drive control section 610 measures the time interval, namely the time having elapsed from the previous switch in which the anode duty ratio of the electrode 520b has been switched between the larger value and the smaller value to the present switch.

After the interval measurement process (step S436), the drive control section 610 sets the anode duty ratio of the electrode 520b (step S438) in accordance with the time internal thus measured by the interval measurement process (step S436), and then terminates the deterioration handling process (step S430). Subsequently, in the current control process (step S200), the drive control section 610 controls the alternating current supplied from the lighting circuit 620 to the electrodes 520a, 520b so that the anode duty ratio of the electrode 520b becomes the value corresponding to the time interval thus measured by the interval measurement process (step S436).

Figure 14:
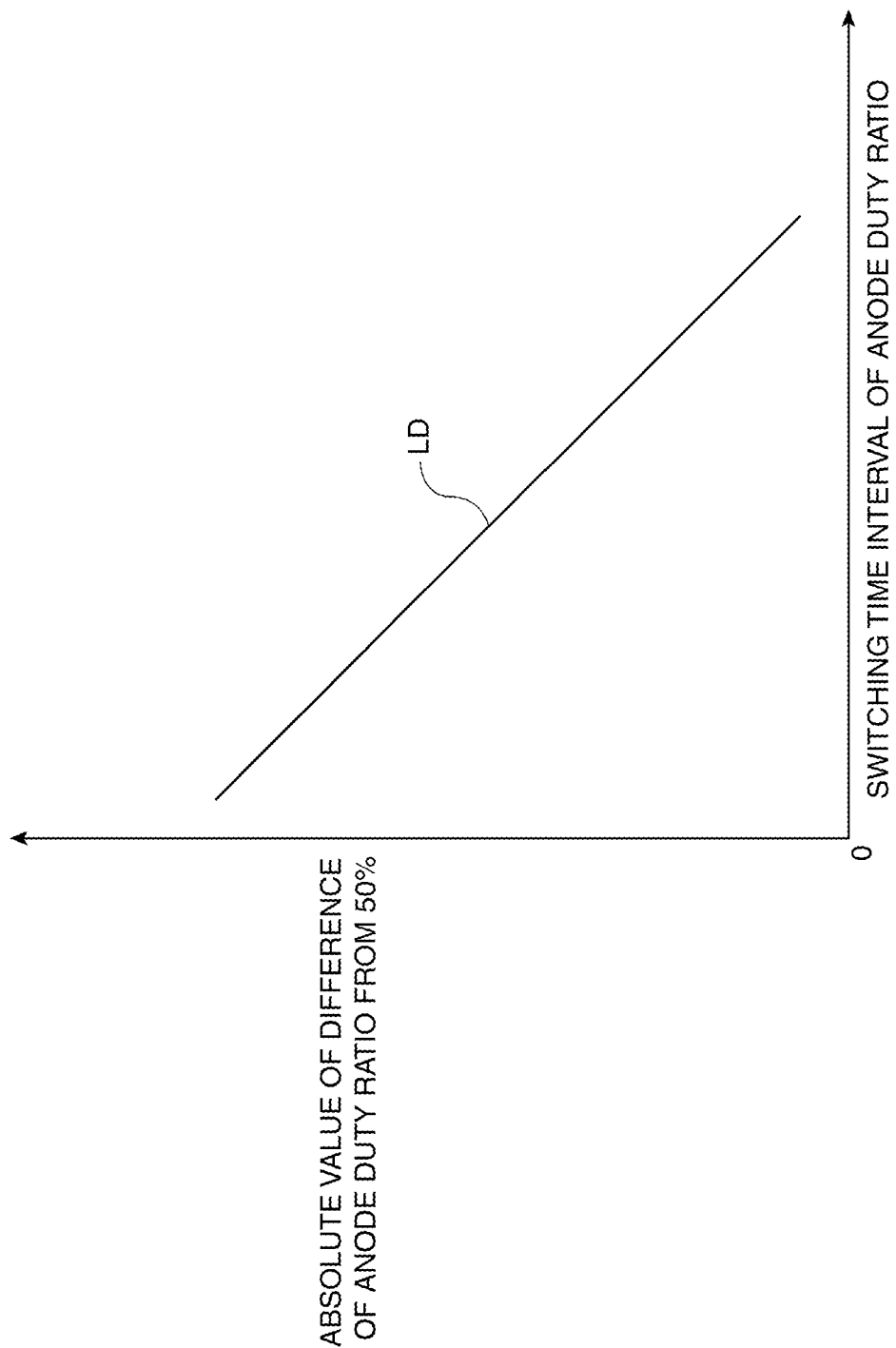
FIG. 14 is an explanatory diagram showing a relationship between an anode duty ratio and a switching time interval in the third modified example.

FIG. 14 is an explanatory diagram showing a relationship between the anode duty ratio and the switching time interval in the third modified example. In FIG. 14, the lateral axis represents the time interval with which the anode duty ratio is switched between the larger value and the smaller value, and the vertical axis represents the absolute value of the difference of the anode duty ratio from 50%. As illustrated by a straight line LD shown in FIG. 14, the shorter the switching time interval is, the larger the absolute value of the distance of the anode duty ratio from 50% becomes. In other words, the shorter the time interval measured by the interval measurement process (step S436) is, the larger the width of the variation with which the anode duty ratio of the electrode 520b is switched between the larger value and the smaller value is set, under the judgment that the further the deterioration of the electrodes 520a, 520b is advanced to be in the state in which the electrodes 520a, 520b are hard to melt.

According to the deterioration handling process (step S430), the anode power energy Eb is smaller than the anode power energy Ea if the lamp voltage LV is lower than 90 volts, substantially equal to the anode power energy Ea if the lamp voltage LV is equal to or higher than 90 volts and lower than 100 volts, or repeatedly takes the state of being greater than the anode power energy Ea and the state of being smaller than the anode power energy Ea alternately if the lamp voltage LV is equal to or higher than 100 volts. As a result of the deterioration handling process (step S430), in the initial state in which the lamp voltage LV is lower than 90 volts, the amount of heat generation in the electrode 520b on the side of the secondary reflecting mirror 214 is reduced, and thus the excessive melting of the electrode 520b can be prevented. Subsequently, in the middle state in which the deterioration in the electrodes 520a, 520b is advanced to make lamp voltage LV equal to or higher than 90 volts and lower than 100 volts, the amount of heat generation in the electrode 520b is made greater than that in the initial state, and thus the insufficient melting of the electrode 520b can be prevented. Subsequently, in the terminal state in which the deterioration in the electrodes 520a, 520b is further advanced to make the lamp voltage LV equal to or higher than 100 volts, the amount of heat generation in the electrode 520b on the side of the secondary reflecting mirror 214 is further increased to be larger than in the middle state, thus it is achieved to keep the projection section 526b on the electrode 520b, and at the same time, the amount of heat generation in the electrode 520a on the side of the primary reflecting mirror 212 side is further increased to be larger than in the middle state, thus it is also achieved to keep the projection section 526a on the electrode 520a.

According to the driving device 600 of the third modified example explained hereinabove, the amount of heat generated in the electrode 520b on the side of the secondary reflecting mirror 214 is increased in accordance with the degree of progression of the deterioration in the electrodes 520a, 520b, and thus the progression of the deterioration due to the insufficient melting in the electrode 520b can be prevented. As a result, longer operating life of the discharge lamp 500 can be achieved. Further, since the anode power energy Ea, Eb is switched between a larger value and a smaller value alternately in accordance with the deterioration level DT, thereby increasing the anode power energy Eb in accordance with the deterioration level DT (step S438), it is possible to prevent the insufficient melting in the electrode 520a on the side of the primary reflecting mirror 212 caused by increasing the anode power energy Eb and reducing the anode power energy Ea. Further, since the difference between the larger value and the smaller value of the anode power energy Ea, Eb is varied in accordance with the time interval with which the anode duty ratio is switched between the larger value and the smaller value (step S438), the insufficient melting in both of the electrodes 520a, 520b can be prevented in accordance with how difficult the melting is in the electrodes 520a, 520b.

E. FOURTH MODIFIED EXAMPLE

The driving device 600 of the fourth modified example is substantially the same as in the third modified example except the point that the relationship between the anode duty ratio and the switching time interval is different.

Figure 15:
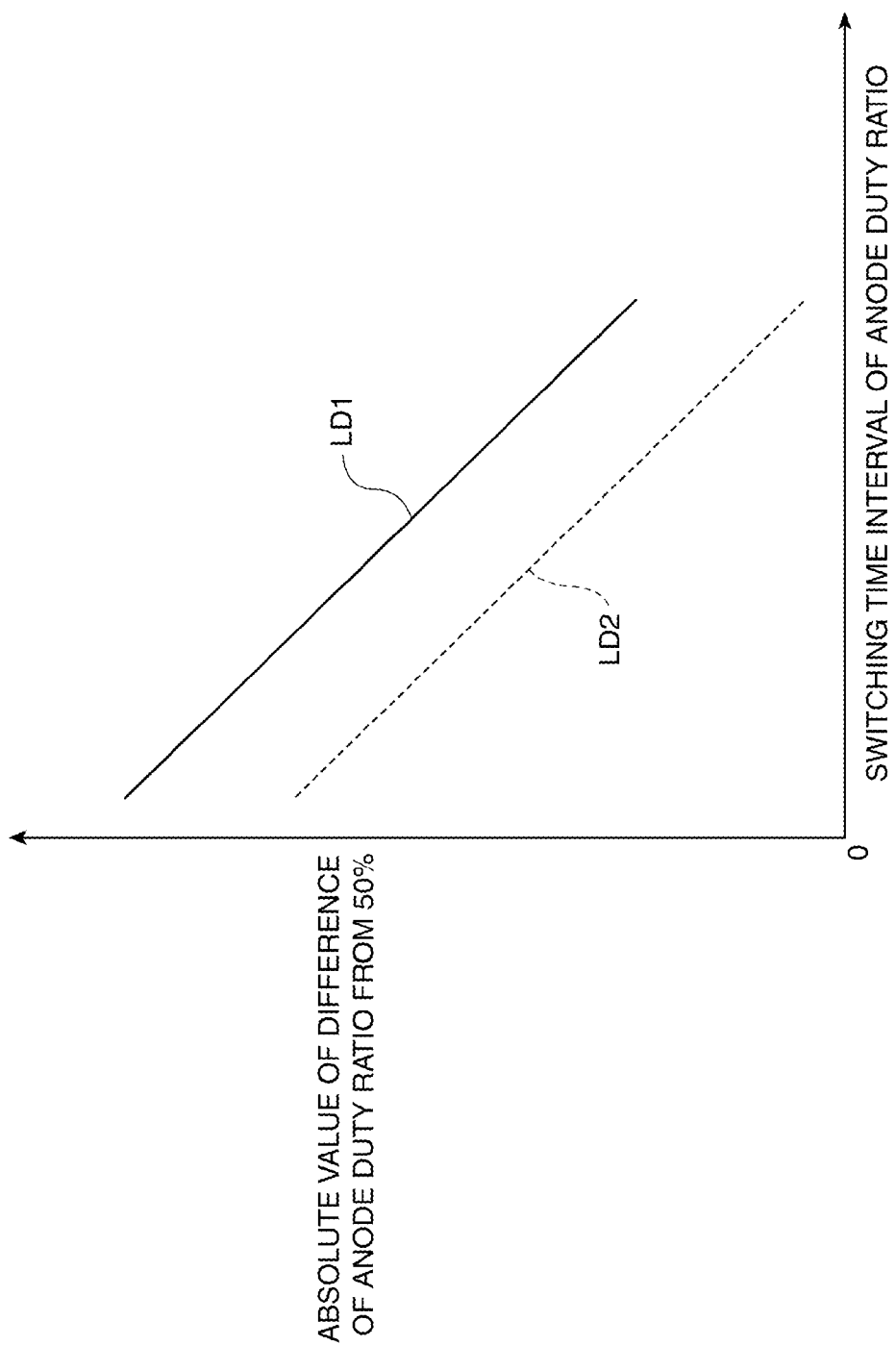
FIG. 15 is an explanatory diagram showing a relationship between an anode duty ratio and a switching time interval in a fourth modified example.

FIG. 15 is an explanatory diagram showing the relationship between the anode duty ratio and the switching time interval in the fourth modified example. In FIG. 15, the lateral axis represents the time interval with which the anode duty ratio is switched between the larger value and the smaller value, and the vertical axis represents the absolute value of the difference of the anode duty ratio from 50%. The straight line LD1 shown in FIG. 15 represents the value used when setting the anode duty ratio of the electrode 520b to be larger than 50%, and the straight line LD2 shown in FIG. 15 represents the value used when setting the anode duty ratio of the electrode 520b to be smaller than 50%. The absolute value of the difference of the anode duty ratio from 50% represented by the straight line LD1 shows a value larger than the absolute value of the straight line LD2 at the same switching time interval. As illustrated by the straight lines LD1, LD2, the shorter the switching time interval is, the larger the absolute value of the distance of the anode duty ratio from 50% becomes. In other words, the shorter the time interval measured by the interval measurement process (step S436) is, the larger the width of the variation with which the anode duty ratio of the electrode 520b is switched between the larger value and the smaller value is set, under the judgment that the further the deterioration of the electrodes 520a, 520b is advanced to be in the state in which the electrodes 520a, 520b are hard to melt.

According to the driving device 600 of the fourth modified example explained hereinabove, the amount of heat generated in the electrode 520b on the side of the secondary reflecting mirror 214 is increased in accordance with the degree of progression of the deterioration in the electrodes 520a, 520b, and thus the progression of the deterioration due to the insufficient melting in the electrode 520b can be prevented. As a result, longer operating life of the discharge lamp 500 can be achieved. Further, since the anode power energy Ea, Eb is switched between a larger value and a smaller value alternately in accordance with the deterioration level DT, thereby increasing the anode power energy Eb in accordance with the deterioration level DT (step S438), it is possible to prevent the insufficient melting in the electrode 520a on the side of the primary reflecting mirror 212 caused by increasing the anode power energy Eb and reducing the anode power energy Ea. Further, since the difference between the larger value and the smaller value of the anode power energy Ea, Eb is varied in accordance with the time interval with which the anode duty ratio is switched between the larger value and the smaller value (step S438), the insufficient melting in both of the electrodes 520a, 520b can be prevented in accordance with how difficult the melting is in each of the electrodes 520a, 520b.

F. FIFTH MODIFIED EXAMPLE

The driving device 600 of the fifth modified example is substantially the same as in the embodiment described above except the point that the alternating current is controlled with hysteresis.

Figure 16:
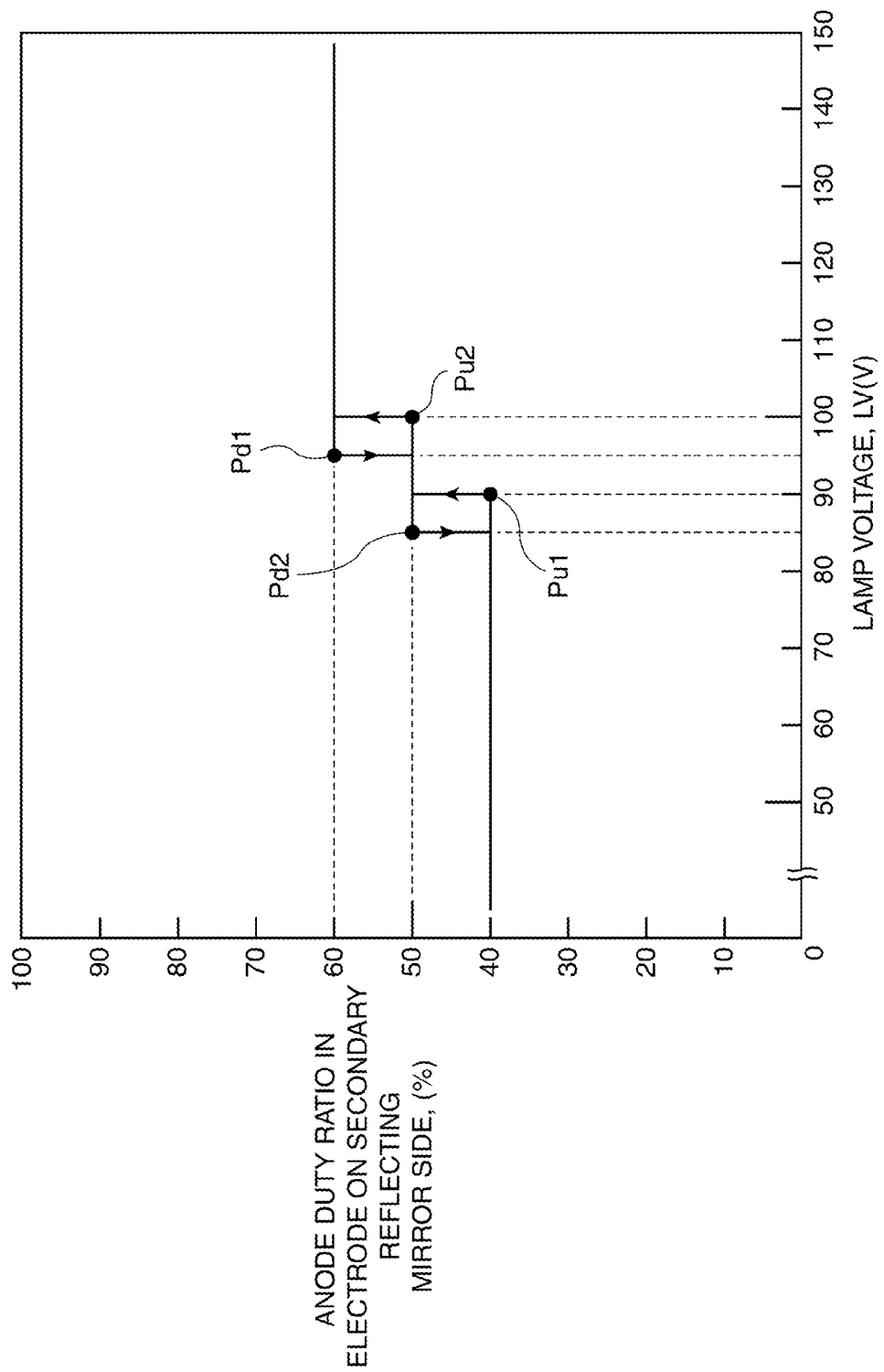
FIG. 16 is an explanatory diagram showing a relationship between the anode duty ratio of the alternating current controlled by the deterioration handling process in a fifth modified example and the lamp voltage.

FIG. 16 is an explanatory diagram showing a relationship between the anode duty ratio of the alternating current controlled by the deterioration handling process in the fifth modified example and the lamp voltage LV. In FIG. 16, the lateral axis represents the lamp voltage LV between the electrodes 520a, 520b, and the vertical axis represents the anode duty ratio of the electrode 520b.

The anode duty ratio of the electrode 520b is 40% if the lamp voltage LV is lower than 85 volts, kept to be 40% if the lamp voltage LV increases from a value lower than 85 volts to a value exceeding 85 volts in the state in which the anode duty ratio of the electrode 520b is 40%, and set to be 50% if the lamp voltage LV increases from a value lower than 90 volts to a value exceeding 90 volts. The anode duty ratio of the electrode 520b is 50% if the lamp voltage LV is equal to or higher than 90 volts and lower than 95 volts, kept to be 50% if the lamp voltage LV increases from a value lower than 95 volts to a value exceeding 95 volts in the state in which the anode duty ratio of the electrode 520b is 50%, and set to be 60% if the lamp voltage LV increases from a value lower than 100 volts to a value exceeding 100 volts.

The anode duty ratio of the electrode 520b is 60% if the lamp voltage LV is equal to or higher than 100 volts, kept to be 60% if the lamp voltage LV decreases from a value higher than 100 volts to a value falling below 100 volts in the state in which the anode duty ratio of the electrode 520b is 60%, and set to be 50% if the lamp voltage LV decreases from a value equal to or higher than 95 volts to a value falling below 95 volts. The anode duty ratio of the electrode 520b is 50% if the lamp voltage LV is equal to or higher than 90 volts and lower than 95 volts, kept to be 50% if the lamp voltage LV decreases from a value equal to or higher than 90 volts to a value falling below 90 volts in the state in which the anode duty ratio of the electrode 520b is 50%, and set to be 40% if the lamp voltage LV decreases from a value equal to or higher than 85 volts to a value falling below 85 volts.

According to the driving device 600 of the fifth modified example explained hereinabove, the amount of heat generated in the electrode 520b on the side of the secondary reflecting mirror 214 is increased in accordance with the degree of progression of the deterioration in the electrodes 520a, 520b, and thus the progression of the deterioration due to the insufficient melting in the electrode 520b can be prevented. As a result, longer operating life of the discharge lamp 500 can be achieved. Further, prevention of the excessive melting and insufficient melting in the electrode 520b can effectively be executed in accordance with the progression and improvement of the deterioration level DT.

G. Other Embodiments

Although the embodiment of the invention is hereinabove explained, the invention is not at all limited to the embodiment, but can obviously be put into practice in various forms within the scope or the spirit of the invention. For example, it is obvious that the various values for controlling the alternating current supplied to the electrodes 520a, 520b can appropriately be modified in accordance with characteristics of the electrodes 520a, 520b. Further, increase and decrease in the anode power energy Ea, Eb is not limited to those realized by varying the anode duty ratio, but can also be realized by increase and decrease in the current value during the anode period, expansion and contraction of the anode period, or combinations of at least increase and decrease in the current value during the anode period and expansion and contraction of the anode period in other embodiments.

The entire disclosure of Japanese Patent Application No. 2009-022251, filed Feb. 3, 2009 is expressly incorporated by reference herein.

What is claimed is:

1. A driving device adapted to drive a discharge lamp including a first electrode and a second electrode adapted to generate discharge light, a primary reflecting mirror disposed on a side of the second electrode and adapted to reflect the discharge light, a secondary reflecting mirror disposed on a side of the first electrode so as to be opposed to the primary reflecting mirror, and adapted to reflect the discharge light, which is emitted toward the first electrode side, toward the primary reflecting mirror, the driving device comprising:

a deterioration detection section adapted to detect a degree of progression of deterioration in the first and the second electrodes; and a deterioration handling section adapted to increase first anode power energy, which is supplied while the first electrode acts as an anode, in accordance with the degree of progression of the deterioration detected by the deterioration detection section, wherein:
the deterioration handling section increases the first anode power energy to a first energy value when the degree of progression of the deterioration detected by the deterioration detection section is equal to or greater than a first threshold value, and the deterioration handling section increases the first anode power energy to a second energy value that is larger than the first energy value when the degree of progression of the deterioration detected by the deterioration detection section is equal to or greater than a second threshold value that is larger than the first threshold value.

2. The driving device according to claim 1, wherein the deterioration detection section detects the degree of progression of the deterioration in the first and second electrodes based on at least one of a voltage in the first and second electrodes, a current in the first and second electrodes, a flicker of the discharge light, and illuminance of the discharge light.

3. The driving device according to claim 1, wherein the deterioration handling section increases the first anode power energy from an initial state of being smaller than second anode power energy, which is supplied while the second electrode acts as the anode, in accordance with the degree of progression of the deterioration detected by the deterioration detection section.

4. The driving device according to claim 1, wherein the deterioration handling section increases the first anode power energy from a state of being smaller than second anode power energy, which is supplied while the second electrode acts as the anode, to a state of being larger than the second anode power energy in accordance with the degree of progression of the deterioration detected by the deterioration detection section.

5. The driving device according to claim 1, wherein the deterioration handling section switches the first and second anode power energy supplied while the first and second electrodes act as the anode, respectively, between a larger value and a smaller value alternately in accordance with the degree of progression of the deterioration detected by the deterioration detection section, thereby increasing the first anode power energy in accordance with the degree of progression of the deterioration.

6. The driving device according to claim 5, wherein the deterioration handling section increases a difference between the larger value and the smaller value in the first and second anode power energy in accordance with the degree of progression of the deterioration while alternately switching the first and second anode power energy between the larger value and the smaller value in accordance with the degree of progression of the deterioration, thereby increasing the first anode power energy in accordance with the degree of progression of the deterioration.

7. The driving device according to claim 5, wherein the deterioration handling section is adapted to:
measure a time interval with which the first and second anode power energy is switched between the larger value and the smaller value, and
adjust a difference between the larger value and the smaller value in the first and second anode power energy in accordance with the time interval measured by the interval measurement section.

8. The driving device according to claim 1, wherein the deterioration handling section executes at least one of change in a ratio between the anode periods during which the first and second electrodes act as the anode, respectively, and increase and decrease of a current value supplied while the first electrode acts as the anode, thereby increasing the first anode power energy in accordance with the degree of progression of the deterioration.

9. A light source device adapted to emit light, comprising:
a discharge lamp adapted to emit discharge light generated between a first electrode and a second electrode;
a primary reflecting mirror disposed on a side of the second electrode and adapted to reflect the discharge light;
a secondary reflecting mirror disposed on a side of the first electrode so as to be opposed to the primary reflecting mirror, and adapted to reflect the discharge light, which is emitted toward the first electrode side, toward the primary reflecting mirror;
a deterioration detection section adapted to detect a degree of progression of deterioration in the first and the second electrodes; and
a deterioration handling section adapted to increase first anode power energy, which is supplied while the first electrode acts as an anode, in accordance with the degree of progression of the deterioration detected by the deterioration detection section, wherein:
the deterioration handling section increases the first anode power energy to a first energy value when the degree of progression of the deterioration detected by the deterioration detection section is equal to or greater than a first threshold value, and the deterioration handling section increases the first anode power energy to a second energy value that is larger than the first energy value when the degree of progression of the deterioration detected by the deterioration detection section is equal to or greater than a second threshold value that is larger than the first threshold value.

10. A projector adapted to project an image, comprising:
a discharge lamp adapted to emit discharge light generated between a first electrode and a second electrode as a light source of projection light adapted to represent the image;
a primary reflecting mirror disposed on a side of the second electrode and adapted to reflect the discharge light;
a secondary reflecting mirror disposed on a side of the first electrode so as to be opposed to the primary reflecting mirror, and adapted to reflect the discharge light, which is emitted toward the first electrode side, toward the primary reflecting mirror;
a deterioration detection section adapted to detect a degree of progression of deterioration in the first and the second electrodes; and
a deterioration handling section adapted to increase first anode power energy, which is supplied while the first electrode acts as an anode, in accordance with the degree of progression of the deterioration detected by the deterioration detection section,
wherein:
the deterioration handling section increases the first anode power energy to a first energy value when the degree of progression of the deterioration detected by the deterioration detection section is equal to or greater than a first threshold value, and
the deterioration handling section increases the first anode power energy to a second energy value that is larger than the first energy value when the degree of progression of the deterioration detected by the deterioration detection section is equal to or greater than a second threshold value that is larger than the first threshold value.

11. The projector according to claim 10, wherein the deterioration detection section detects the degree of progression of the deterioration in the first and second electrodes based on at least one of a voltage in the first and second electrodes, a current in the first and second electrodes, a flicker of the discharge light, and illuminance of the discharge light.

12. The projector according to claim 10, wherein the deterioration handling section increases the first anode power energy from an initial state of being smaller than second anode power energy, which is supplied while the second electrode acts as the anode, in accordance with the degree of progression of the deterioration detected by the deterioration detection section.

13. The projector according to claim 10, wherein the deterioration handling section increases the first anode power energy from a state of being smaller than second anode power energy, which is supplied while the second electrode acts as the anode, to a state of being larger than the second anode power energy in accordance with the degree of progression of the deterioration detected by the deterioration detection section.

14. The projector according to claim 10, wherein the deterioration handling section switches the first and second anode power energy supplied while the first and second electrodes act as the anode, respectively, between a larger value and a smaller value alternately in accordance with the degree of progression of the deterioration detected by the deterioration detection section, thereby increasing the first anode power energy in accordance with the degree of progression of the deterioration.

15. The projector according to claim 14, wherein the deterioration handling section increases a difference between the larger value and the smaller value in the first and second anode power energy in accordance with the degree of progression of the deterioration while alternately switching the first and second anode power energy between the larger value and the smaller value in accordance with the degree of progression of the deterioration, thereby increasing the first anode power energy in accordance with the degree of progression of the deterioration.

16. The projector according to claim 14, wherein the deterioration handling section is adapted to:
measure a time interval with which the first and second anode power energy is switched between the larger value and the smaller value, and
adjust a difference between the larger value and the smaller value in the first and second anode power energy in accordance with the time interval measured by the interval measurement section.

17. The projector according to claim 10, wherein the deterioration handling section executes at least one of change in a ratio between the anode periods during which the first and second electrodes act as the anode, respectively, and increase and decrease of a current value supplied while the first electrode acts as the anode, thereby increasing the first anode power energy in accordance with the degree of progression of the deterioration.

18. A driving method adapted to drive a discharge lamp including a first electrode and a second electrode adapted to generate discharge light, a primary reflecting mirror disposed on a side of the second electrode and adapted to reflect the discharge light, and a secondary reflecting mirror disposed on a side of the first electrode so as to be opposed to the primary reflecting mirror, and adapted to reflect the discharge light, which is emitted toward the first electrode side, toward the primary reflecting mirror, the driving method comprising:
detecting a degree of progression of deterioration in the first and the second electrodes; and
increasing first anode power energy, which is supplied while the first electrode acts as an anode, in accordance with the degree of progression of the deterioration detected in the detecting step,
wherein increasing the first anode power energy further includes:
increasing the first anode power energy to a first energy value when the degree of progression of the deterioration detected by the deterioration detection section is equal to or greater than a first threshold value, and
increasing the first anode power energy to a second energy value that is larger than the first energy value when the degree of progression of the deterioration detected by the deterioration detection section is equal to or greater than a second threshold value that is larger than the first threshold value.

* * * * *